United States Patent [19]
Fan et al.

[11] Patent Number: 6,101,300
[45] Date of Patent: Aug. 8, 2000

[54] HIGH EFFICIENCY CHANNEL DROP FILTER WITH ABSORPTION INDUCED ON/OFF SWITCHING AND MODULATION

[75] Inventors: Shanhui Fan, Somerville; Pierre R. Villeneuve, Boston; John D. Joannopoulos, Belmont; Brent E. Little, Boston; Hermann A. Haus, Lexington, all of Mass.

[73] Assignee: Massachusetts Institute of Technology, Cambridge, Mass.

[21] Appl. No.: 09/080,037

[22] Filed: May 15, 1998

Related U.S. Application Data

[63] Continuation-in-part of application No. 08/968,314, Nov. 12, 1997, which is a continuation-in-part of application No. 08/871,747, Jun. 9, 1997, abandoned.

[51] Int. Cl.[7] .................................................. G02B 6/293
[52] U.S. Cl. .................................. 385/27; 385/1; 385/24; 385/39; 385/40; 385/50
[58] Field of Search .................................... 385/1, 2, 4, 8, 385/9, 15, 16, 24, 27–29, 32, 39, 40, 50, 129

[56] References Cited

U.S. PATENT DOCUMENTS

| | | | |
|---|---|---|---|
| 3,589,794 | 6/1971 | Marcatili | 385/42 |
| 4,097,826 | 6/1978 | Knox et al. | 333/202 |
| 4,282,499 | 8/1981 | DeFonzo | 333/231 |
| 4,695,121 | 9/1987 | Mahapatra et al. | 385/40 |
| 4,720,160 | 1/1988 | Hicks . | |

(List continued on next page.)

FOREIGN PATENT DOCUMENTS 196 34 893   5/1997   Germany .

OTHER PUBLICATIONS

Koops, H. W. P., "Photonic Crystals Built By Three–Dimensional Additive Lithography Enable Integrated Optics of High Density," vol. 2849, (Aug. 5, 1996): 248–256 (SPIE).

Fan et al., "Theoretical investigation of Fabrication–Related disorder on the properties of Photonic Crystals," *J. Appl. Physics,* vol. 78(3), (Aug. 1995): 1415–1418.

Villeneuve et al., "Microcavities in Photonic Crystals: Mode Symmetry, Tunability, and Coupling Efficiency," *Physical Review B,* vol. 54 No. 11, (Sep. 1996): 7837–7842.

Villeneuve et al., "Single–Mode Waveguide Microcavity for Fast Optical Switching," *Optics Letters,* vol. 21 No. 24, (Dec. 1996):2017–2019.

Micro–Ring Resonator Channel Dropping Filters by B.E. Little, S.T. Chu and H.A. Haus; 1995 IEEE LEOS Annual Meeting: vol. 2, Nov. 1–2, 1995.

Microring Resonator Channel Dropping Filters by B.E. Little, S.T. Chu, H.A. Haus, J. Foresi, and J.P. Laine, Journal of Lightwave Technology, vol. 15, No. 6, Jun. 1997.

*Primary Examiner*—John D. Lee
*Assistant Examiner*—Michael J. Stahl
*Attorney, Agent, or Firm*—Samuels, Gauthier & Stevens, LLP

[57] ABSTRACT

A highly efficient channel drop filter. The filter employs a coupling element including a resonator-system between two waveguides, which contains at least two resonant modes. The resonator-system includes one or more interacting resonant cavities which in addition to being coupled to the waveguides, can also be coupled directly among themselves and indirectly among themselves via the waveguides. Each component of the coupling element can be configured or adjusted individually. The geometry and/or dielectric constant/refractive index of the resonator-system are configured so that the frequencies and decay rates of the resonant modes are made to be substantially the same. The filter can achieve 100% signal transfer between the waveguides at certain frequencies, while completely prohibiting signal transfer at other frequencies. In exemplary embodiments, the filter is configured with photonic crystals. In accordance with alternative embodiments of the invention, the filter is configured as an absorption induced on/off switch and modulator. The switching action is achieved with either electrical or optical absorption.

50 Claims, 21 Drawing Sheets

U.S. PATENT DOCUMENTS

| | | |
|---|---|---|
| 4,759,596 | 7/1988 | Po et al. . |
| 4,772,863 | 9/1988 | Rosenberg et al. ............... 333/212 |
| 4,799,749 | 1/1989 | Börner et al. . |
| 5,187,461 | 2/1993 | Brommer et al. ............. 333/219.1 |
| 5,389,943 | 2/1995 | Brommer et al. ............... 343/909 |
| 5,440,421 | 8/1995 | Fan et al. ...................... 359/344 |
| 5,471,180 | 11/1995 | Brommer et al. ............... 333/202 |
| 5,506,712 | 4/1996 | Sasayama et al. ............... 359/123 |
| 5,600,483 | 2/1997 | Fan et al. ...................... 359/344 |
| 5,682,401 | 10/1997 | Joannopoulos et al. ........... 372/96 |
| 5,712,648 | 1/1998 | Tsujiguchi ...................... 343/909 |
| 5,721,796 | 2/1998 | de Barros et al. ............... 385/37 |
| 5,742,633 | 4/1998 | Stone et al. .................... 372/92 |
| 5,784,400 | 7/1998 | Joannopoulos et al. ........... 372/96 |

-MAX     0     MAX

HIGH EFFICIENCY CHANNEL DROP FILTER WITH ABSORPTION INDUCED ON/OFF SWITCHING AND MODULATION

PRIORITY INFORMATION

This is a continuation-in-part of application Ser. No. 08/968,314 filed on Nov. 12, 1997 which is a continuation-in-part of Ser. No. 08/871,747 filed on Jun. 9, 1997 (abandoned).

SPONSORSHIP INFORMATION

This invention was made with government support under Grant No. 9400334-DMR awarded by National Science Foundation. The government has certain rights in the invention.

BACKGROUND OF THE INVENTION

The invention relates to channel drop filters, and in particular to a highly efficient resonator-system channel drop filter. In exemplary embodiments, photonic crystal channel drop filters are provided.

The increasing interest in photonic integrated circuits (PICs) and the increasing use of all-optical fiber networks as backbones for global communication systems have been based in large part on the extremely wide optical transmission bandwidth provided by dielectric materials. This has accordingly led to an increase demand for the practical utilization of the full optical bandwidth available. In order to increase the aggregate transmission bandwidth, it is generally preferred that the spacing of simultaneously transmitted optical data streams, or optical data channels, be closely packed, to accommodate a larger number of channels. In other words, the difference in wavelength between two adjacent channels is preferably minimized.

Channel dropping filters (CDFs) that access one channel of a wavelength division multiplexed (WDM) signal, and do not disturb the other channels, are essential components of PICs and optical communication systems. Among various devices introduced recently, resonant filters are attractive candidates for channel dropping because they can potentially be used to select a single channel with a very narrow linewidth. A schematic block diagram of a resonator-system CDF 10 is shown in FIG. 1, where two waveguides, the bus 12 and the drop 14, are coupled through a resonator-system 16 having one or more resonant cavities. The bus 12 includes an input port and output port, and the drop 14 includes a forward port and a backward port. While WDM signals (i.e. multi-frequency signals) propagate inside one waveguide (the bus), a single mode is transferred out of the bus and into the other waveguide (the drop), either in the forward or backward propagation direction, while completely prohibiting cross talk between the bus and the drop for all other frequencies. It will be appreciated by those of skill in the art that a channel drop filter is a filter which can transfer a channel from one waveguide to another, such as dropping a channel from one waveguide to another waveguide, or adding a channel from one waveguide to another waveguide.

The performance of a CDF is determined by the transfer efficiency between the two waveguides. Perfect efficiency corresponds to 100% transfer of the selected channel into either the forward or backward direction in the drop, with no transmission or back reflection into the bus. All other channels should remain unaffected by the presence of the optical resonator.

It is also desirable to obtain on/off switching functionality in the CDF. In other words, it is desirable to be able to switch on and off the transfer of a frequency channel. Ideally, in an "on" state, the frequency channel is completely transferred from the bus to the drop waveguide, while in an "off" state, the frequency channel remains unperturbed in the bus waveguide. It is conceivable to achieve such on/off functionality using frequency tuning mechanisms. However, to turn off the device, the resonant frequencies of the coupling element must be shifted out of the entire frequency range of the signal. Such a frequency shift tends to require large switching power, and is not very practical.

Accordingly, it is an object of the invention to use an absorption-induced switching effect to achieve the desired on-off functionality.

SUMMARY OF THE INVENTION

The invention provides a highly efficient channel drop filter. The filter employs a coupling element including a resonator-system between two waveguides, which contains at least two resonant modes. The resonator-system includes one or more interacting resonant cavities which in addition to being coupled to the waveguides, can also be coupled directly among themselves and indirectly among themselves via the waveguides. Each component of the coupling element can be configured or adjusted individually. The geometry and/or dielectric constant/refractive index of the resonator-system are configured so that the frequencies and decay rates of the resonant modes are made to be substantially the same in the case where absorption is not induced inside the resonator-system. The filter can achieve 100% signal transfer between the waveguides at certain frequencies, while completely prohibiting signal transfer at other frequencies. In exemplary embodiments, the filter is configured with photonic crystals.

In accordance with alternative embodiments of the invention, there are provided channel drop filter devices with flat-top and straight-sidewall lineshape characteristics. These lineshape characteristics are realized by using several resonances to couple the waveguides, and by designing the relative positioning of the frequency of each resonance with respect to one another. The usage of multiple resonances also allows the design of optical switches. These devices can switch the signal from a forward to a backward direction, or from a complete to a zero transfer.

Accordingly, in one embodiment of the invention there is provided an electromagnetic field frequency filter which includes an input waveguide which carries a signal having a plurality of frequencies including a desired guided frequency, and an output waveguide. A resonator-system is coupled between the input and output waveguides which transfers the desired guided frequency to the output waveguide and allows transmission of the remaining frequencies through the input waveguides. The resonator-system includes an external sub-element that couples with the input waveguide, the external sub-element having a local mirror plane perpendicular to the waveguides, and defines at least two local resonant modes of opposite symmetry with respect to the mirror plane, the resonant modes having components which cancel in the backward direction of the input waveguide.

In accordance with yet further alternative embodiments of the invention there is provided a channel drop filter with on/off switching functionality. The switching is achieved by incorporating materials with tunable absorbing characteristics into the coupling element. When the tunable material displays minimum absorption, the frequency channel of interest is transferred completely from the bus waveguide to the drop waveguide. When the material displays maximum absorption, on the other hand, the frequency channel is not transferred, but rather remains undisturbed in the bus waveguide. The switching action can be readily achieved with either electrical or optical means.

DETAILED DESCRIPTION OF THE ILLUSTRATED EMBODIMENTS

The invention provides a design of a resonator-system CDF (along with its basic properties) which achieves maximum transfer efficiency. For purposes of clarity, the CDF of the invention will be described with respect to embodiments involving dropping a channel from the bus to the drop. It will be appreciated that the CDF of the invention can equally function to transfer a channel from any one waveguide to another waveguide. The design is based on a rigorous symmetry and computational analysis. The CDF in accordance with the invention uses a coupling element between two waveguides, which has at least two resonant modes. The resonator-system includes one or more interacting resonant cavities which in addition to being coupled to the waveguides, can also be coupled directly among themselves and indirectly among themselves via the waveguides. Each component of the coupling element can be configured or adjusted individually. The geometry and/or dielectric constant/refractive index of the resonator-system are configured so that the frequencies and decay rates of the resonant modes are made to be substantially the same. The aforementioned characteristic is specific to the case where absorption is not induced inside the resonator-system.

It will be shown that, in certain cases such as in the case of a photonic crystal CDF, transfer efficiencies of 100% can be achieved. Two specific embodiments using photonic crystals will be presented, as well as an embodiment which is a combination of a photonic crystal resonator-system and conventional waveguides. An embodiment will also be presented which uses nonlinear materials to achieve tuning of the CDF. In addition, further embodiments of the invention will be described which utilize absorption effects to induce on/off switching and modulation of the CDF.

Figure 1:
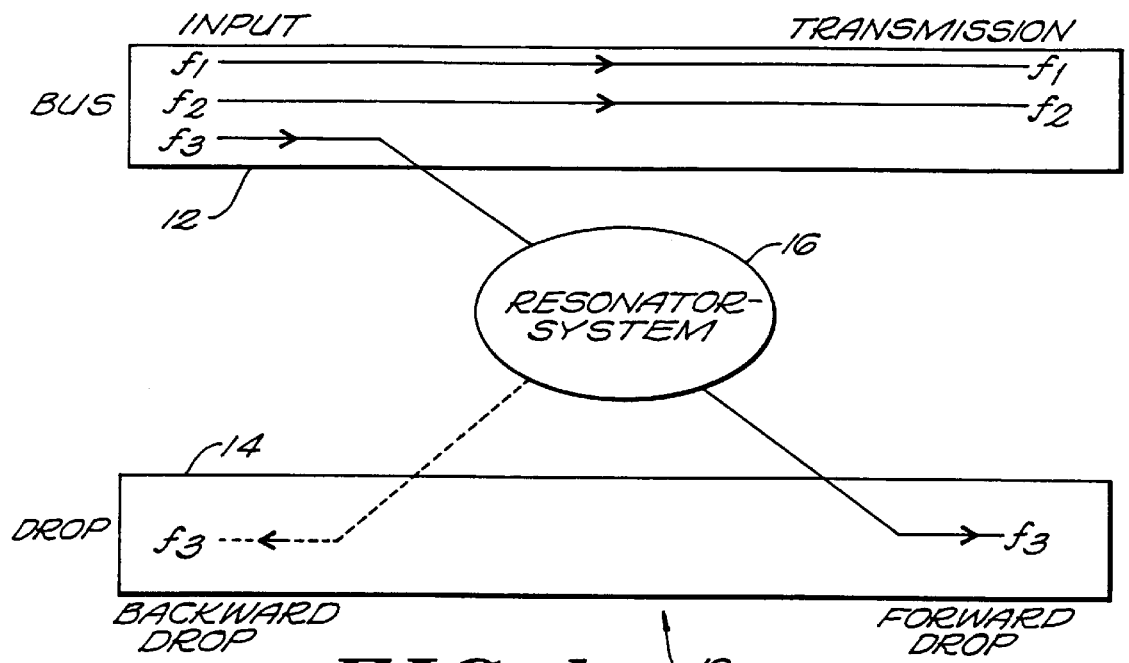
FIG. 1 is a schematic block diagram of a generic resonator-system CDF.

Initially, the generic CDF structure 10 shown in FIG. 1 must be considered to determine the basic properties required to achieve 100% transfer efficiency. At the resonant frequency, the guided mode inside the bus waveguide 12 excites the modes of the resonator-system 16. In turn, the resonator-system modes decay both into the bus waveguide 12 and into the drop waveguide 14.

The transmitted signal is composed of the input signal and the signal which originates from the decay of the resonator-system modes. By properly configuring the resonator-system, it is possible for these signals to interfere destructively and cancel each other, resulting in zero transmission as required. The reflected signal, on the other hand, originates entirely from the decay of the resonator-system mode. To achieve perfect transfer efficiency, the resonator-system is configured such that the resonator-system signal does not decay into the backward direction in the bus.

In order to achieve zero transmission and zero reflection, it is necessary to have a structure with modes of opposite symmetry. Consider the case in which the structure of FIG. 1 has mirror-plane symmetry perpendicular to the waveguides, and that the resonator-system supports two resonant states, one with even symmetry, whose electromagnetic field is labelled |even>, and one with odd symmetry, whose electromagnetic field is labelled |odd>, with respect to the mirror plane. Examples of even and odd states are shown in FIGS. 2A and 2B, which are schematic diagrams of contour plots of the resonant mode field patterns in a CDF structure having a mirror-plane symmetry perpendicular to the waveguides, and a resonator-system supporting two resonant states either by using two interacting cavities each of which supports a monopole mode, or by using one cavity which supports a doubly degenerate hexapole mode, respectively.

Figure 2A:
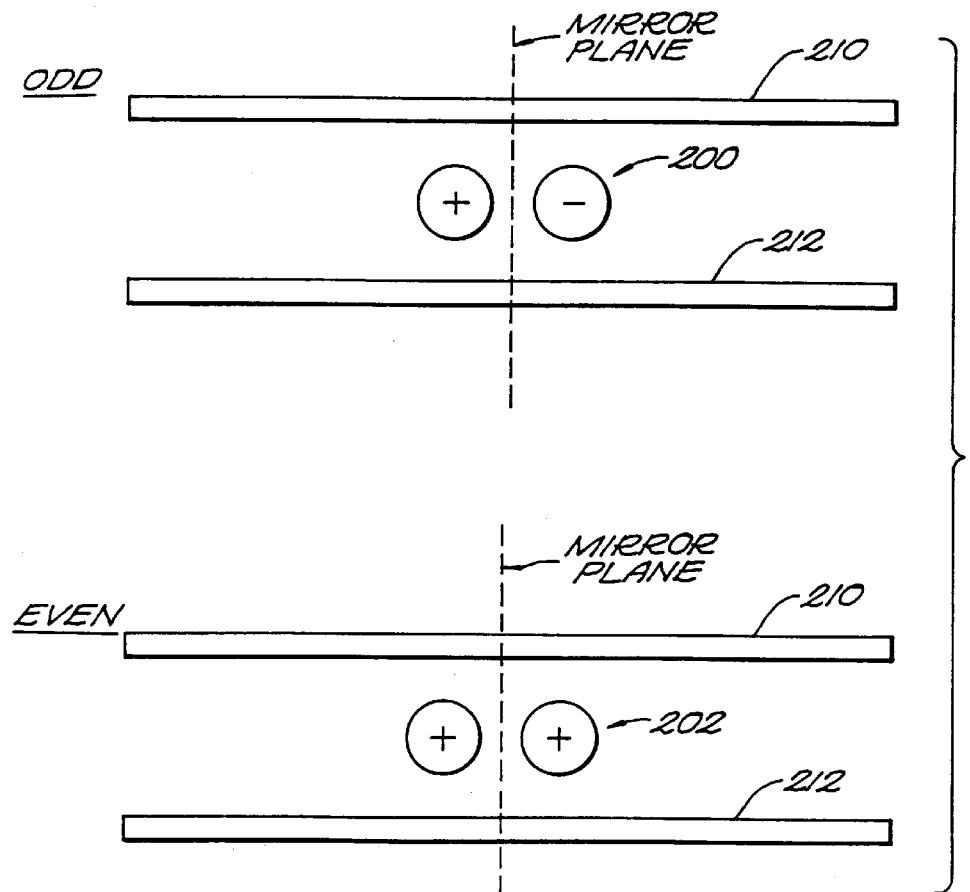
FIGS. 2A and 2B are schematic diagrams of contour plots of the resonant mode field patterns in a CDF structure having a mirror-plane symmetry perpendicular to the waveguides, and a resonator-system supporting two resonant states by using two interacting cavities each of which support a monopole mode, and by using one cavity which supports a doubly degenerate hexapole mode, respectively.
Figure 2B:
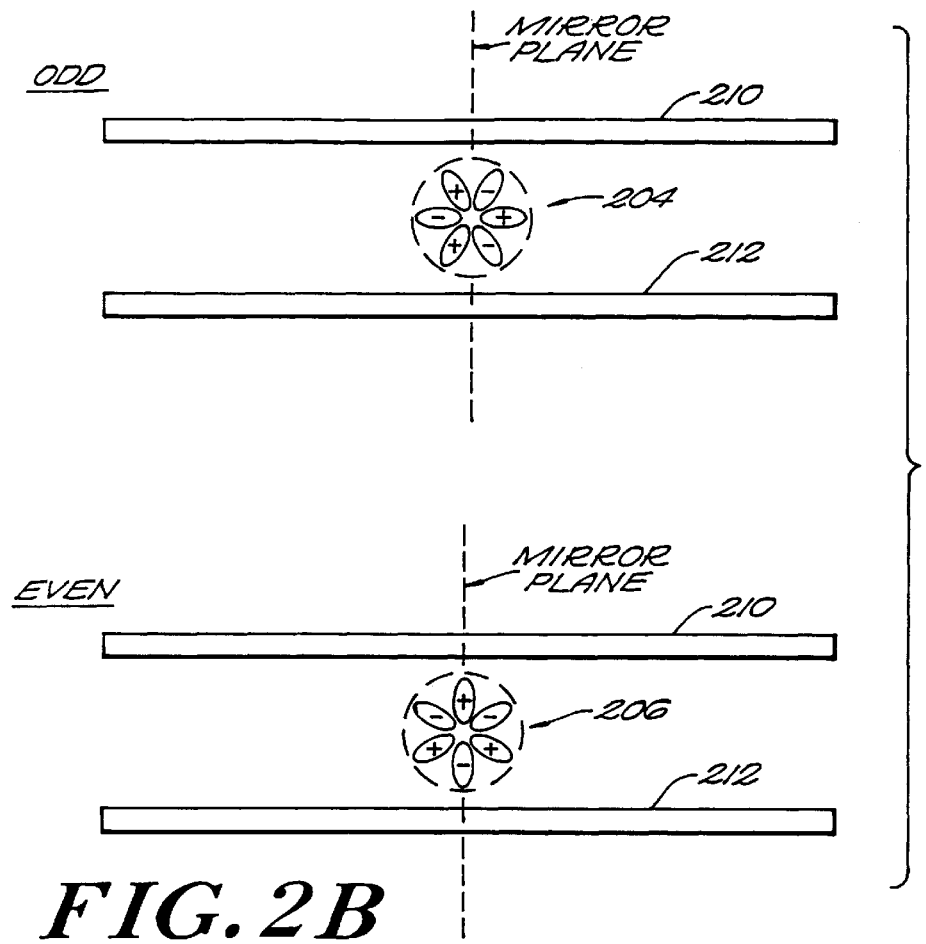

FIG. 2A shows the odd 200 and even 202 field patterns of a structure with two coupled cavities supporting monopole modes, and FIG. 2B shows the odd 204 and even 206 field patterns of a structure with a single cavity supporting a doubly-degenerate hexapole mode. The + and − signs indicate the sign of the field. The two rectangles adjacent the field patterns represent the bus 210 and drop 212 waveguides.

An incoming wave $e^{ikx}$ can then be decomposed into the form cos(kx)+isin(kx), where x corresponds to the direction along the waveguides. The cos(kx) part, which is even with respect to the mirror plane, couples only to the even resonant state. The sin(kx) part, on the other hand, is odd, and couples only to the odd resonant state. In the specific case where the coupling constants are equal for both modes, a resonant state of the form |even>+|odd> is excited, which in turn decays only along the forward direction in the input waveguide. As a consequence, reflection is completely absent.

Maximum CDF efficiency can be achieved, provided that the following hold true. First, the structure possesses at least one mirror plane perpendicular to the waveguides, and supports at least two resonant states of opposite symmetry. Second, the two states have substantially the same frequency. Third, the two states have substantially the same quality factor, determined from the decay of the resonances into the waveguide modes.

Figure 3:
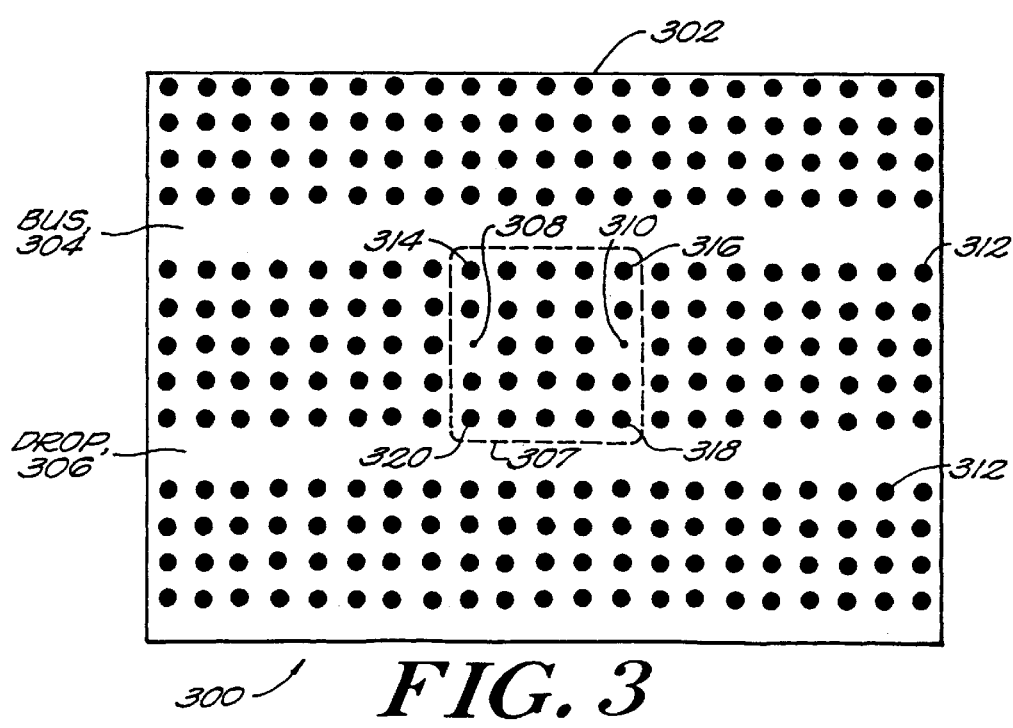
FIG. 3 is a plan view diagram of an exemplary embodiment of a resonator-system photonic crystal CDF in accordance with the invention.

An exemplary embodiment of a resonator-system photonic crystal CDF 300 in accordance with the invention is shown in FIG. 3 in plan view. The CDF 300 includes a photonic crystal 302 having two waveguides, a bus 304 and a drop 306. The CDF also includes a resonator-system 307 which has two point defects or cavities 308, 310. In contrast to other types of resonant cavities, photonic crystal cavities can be truly single mode as described in Villeneuve et al., "Microcavities in photonic crystals: Mode symmetry, tunability, and coupling", Phys. Rev. B 54, 7837 (1996), incorporated herein by reference. Furthermore, photonic crystal cavities do not suffer from intrinsic radiation losses, and are somewhat insensitive to fabrication-related disorder as described in Fan et al., "Theoretical investigation of fabrication-related disorder on the properties of photonic crystals", Journal App. Phys. 78, 1415 (1995), incorporated herein by reference.

In the illustrated embodiment, the photonic crystal 302 is configured as a square lattice of high-index dielectric posts 312 on a substrate such as silicon. The posts have a radius of 0.20 a and a dielectric constant of 11.56, where a is the lattice constant. Two rows of posts are removed to form the waveguides. The coupling element is introduced between the waveguides by altering two posts, thereby defining cavities 308, 310. Each of the cavities has a radius of 0.05 a and a dielectric constant of 6.6. The cavities are five lattice constants apart and two lattice constants away from the waveguide on each side. Each cavity supports a localized monopole state which is singly degenerate. The even and odd states are composed of linear combinations of the two monopoles.

As will be appreciated by those of skill in the art, such a CDF can be fabricated with a photonic crystal in which the contrasting dielectric constants can be achieved by creating channels or holes within a first dielectric material and filling the channels or holes with air or a second dielectric material having a different refractive index than the first material. Examples of various photonic crystal structures and methods of fabrication are found in U.S. Pat. Nos. 5,187,461, 5,389,943, 5,440,421, 5,600,483, 5,682,401 and 5,784,400, all of which are incorporated herein by reference.

Figure 4:
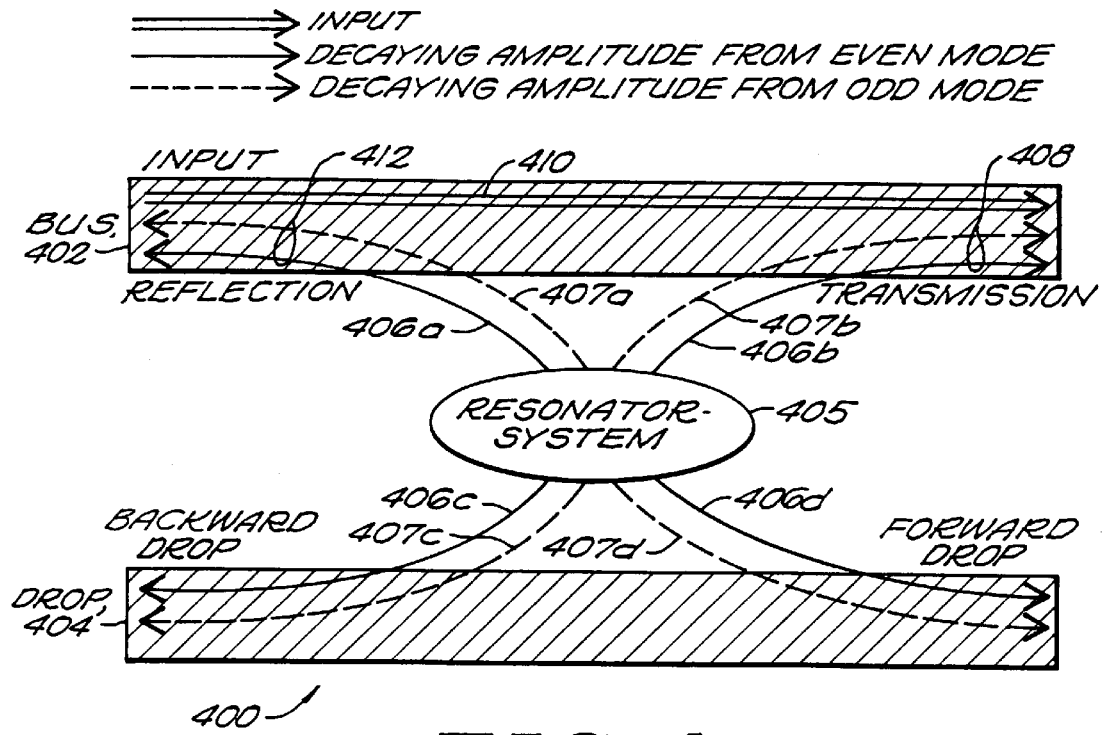
FIG. 4 is a schematic diagram of the physics mechanism for channel dropping in an exemplary filter having a resonator-system supporting one even and one odd degenerate mode.

FIG. 4 is a schematic block diagram of the physics mechanism used for channel dropping in accordance with the invention for an exemplary filter having a resonator-system 405 supporting one even and one odd mode of substantially the same frequency. The schematic includes a channel drop filter 400 having a bus waveguide 402, a drop waveguide 404, and the resonator-system 405 coupled therebetween. At the resonant frequency, the guided mode inside the bus excites both the even and odd modes. In turn, the even 406a–406d and odd 407a–407d modes of the resonator-system decay substantially equally both into the bus and into the drop.

The transmitted signal 408 is composed of three parts, the input signal 410 and the signals 406b and 407b which originate from the decay of the resonator-system modes. These three parts interfere destructively, resulting in zero transmission. The reflected signal 412, on the other hand, is composed of two parts, signals 406*a* and 407*a* which originate from the decay of the resonator-system modes. Under the condition that the even and odd states have substantially the same frequency and substantially the same quality factor, as described heretofore, these two parts cancel, resulting in zero reflection. In the exemplary embodiment, there is no signal in either the backward or forward direction in the drop. The choice of direction will depend on the phase of the decaying amplitudes from the even and odd modes into the bus and the drop.

The two cavities 308 and 310 of the CDF 300 shown in FIG. 3 are coupled indirectly through the waveguides, and directly through the crystal. Each coupling mechanism splits the frequency (i.e. breaks the degeneracy) of the even and odd states, but with an opposite sign. The exact cancellation between the two coupling mechanisms is ensured by changing the dielectric constant of four individual posts 314, 316, 318, 320 in the photonic crystal from 11.56 to 9.5. Alternatively, the radius or shape of the four individual posts could be reduced in order to achieve the same results.

Analytically, it can be shown that the quality factor of the two states can be made equal provided that the wavevector k of the guided mode satisfies the relation k·d=nπ+π/2, where d is the distance between the two cavities (defects), and n is an integer. This condition can be met by separating the two cavities by five lattice constants, and by choosing and altering the size and dielectric constant of the defect posts in such a way that the guided mode at the resonant frequency has a wavevector of $(0.25)2\pi a^{-1}$.

Figure 5:
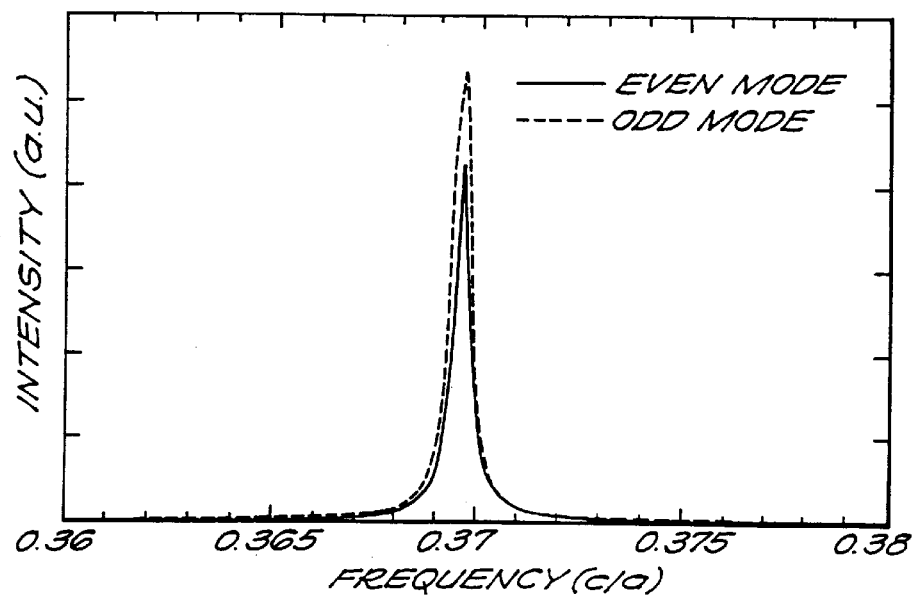
FIG. 5 is a graph of the frequency spectrum of the even and odd modes for the CDF of FIG. 3.

To verify these assumptions, the filter response of the exemplary structure shown in FIG. 3 is computed using a finite-difference time-domain scheme. A pulse is sent down one of the waveguides and excites both the even and odd states. These two states then decay exponentially into the waveguides. By Fourier transforming the decaying amplitudes, the frequency spectrum of the even and odd modes for the structure 300 can be found, each with a Lorentzian lineshape, as shown in the graph of FIG. 5. The two line shapes overlap almost completely, as desired.

Figure 6A:
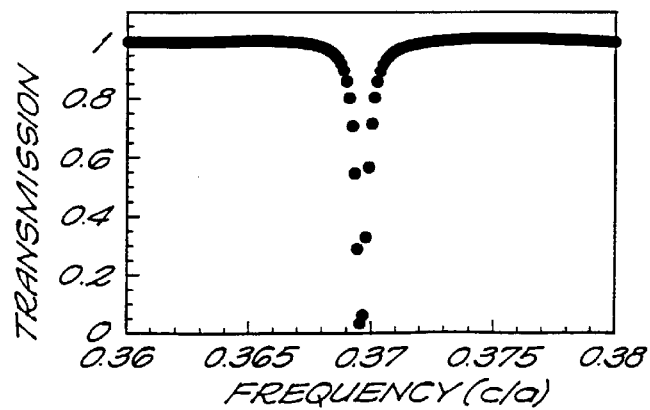
FIGS. 6A–6C are graphs of the spectrum of transmitted signal, and the signal in the forward and backward drops, respectively, for the CDF shown in FIG. 3.
Figure 6B:
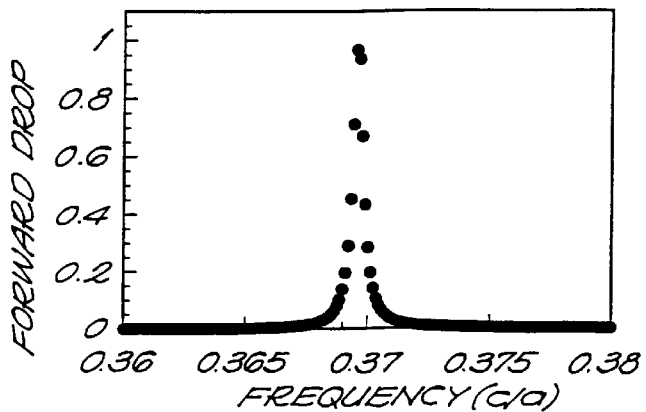
Figure 6C:
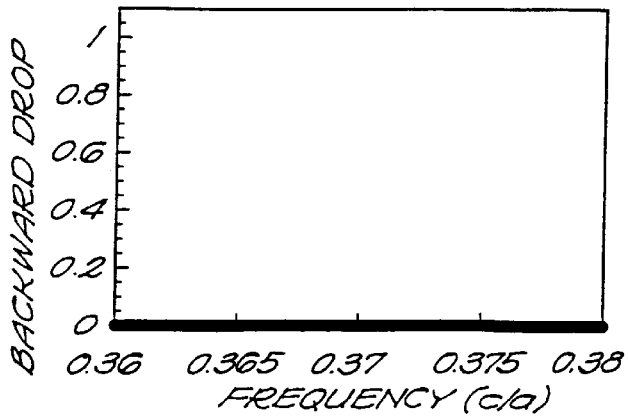

The spectrum of the transmitted signal, and the signal in the forward and backward drops are shown in the graphs of FIGS. 6A–6C, respectively. The transmission efficiency is close to 100% over the entire spectrum, except at the resonant frequency, where it drops to 0% as shown in FIG. 6A. The forward drop shows a Lorentzian lineshape with a maximum close to 100% at resonance. The quality factor is larger than 1000 as shown in FIG. 6B. The backward drop shows almost complete absence of signal as shown in FIG. 6C.

Figure 7:
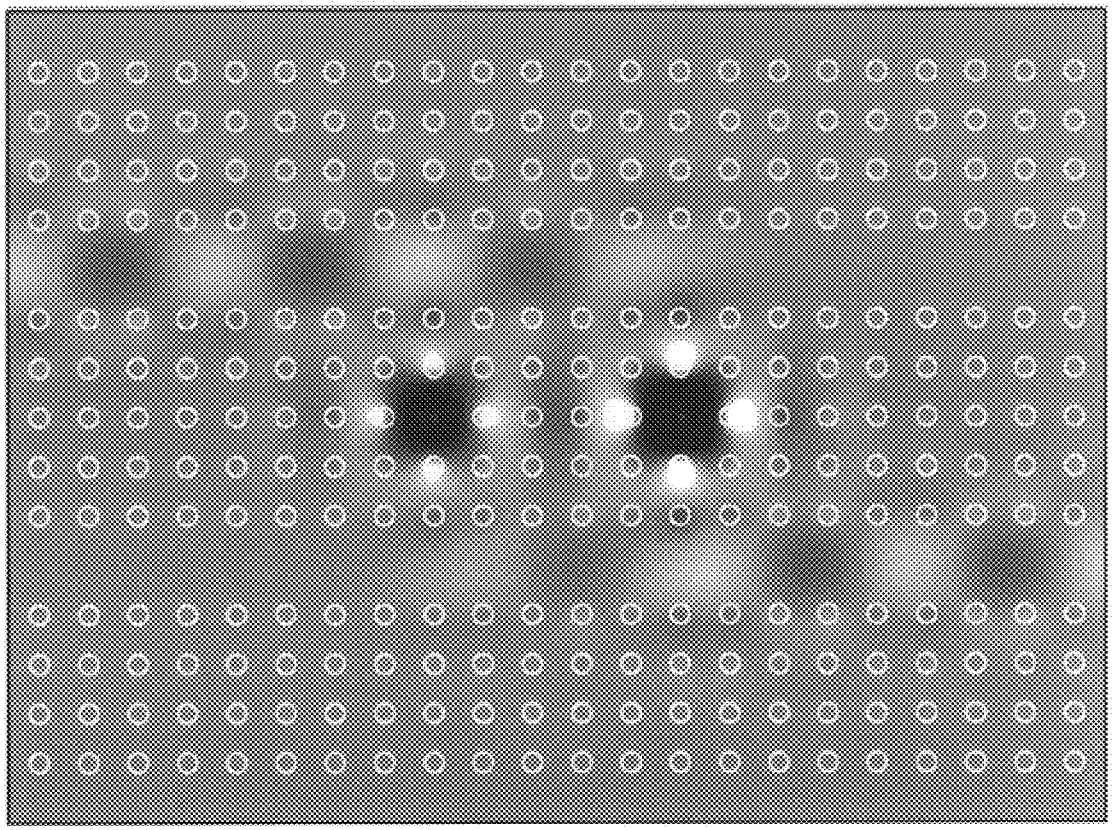
FIG. 7 is a computed electric field pattern at the resonant frequency of the CDF shown in FIG. 3.
Figure 7:

FIG. 7 shows a computed electric field pattern at the resonant frequency of the CDF 300 of FIG. 3. The electric field exhibited is at maximum transfer efficiency at a steady-state frequency of 0.3696 c/a. The power is completely transferred from the bus to the drop. The simulation demonstrates the behavior of an ideal channel drop filter.

Figure 8:
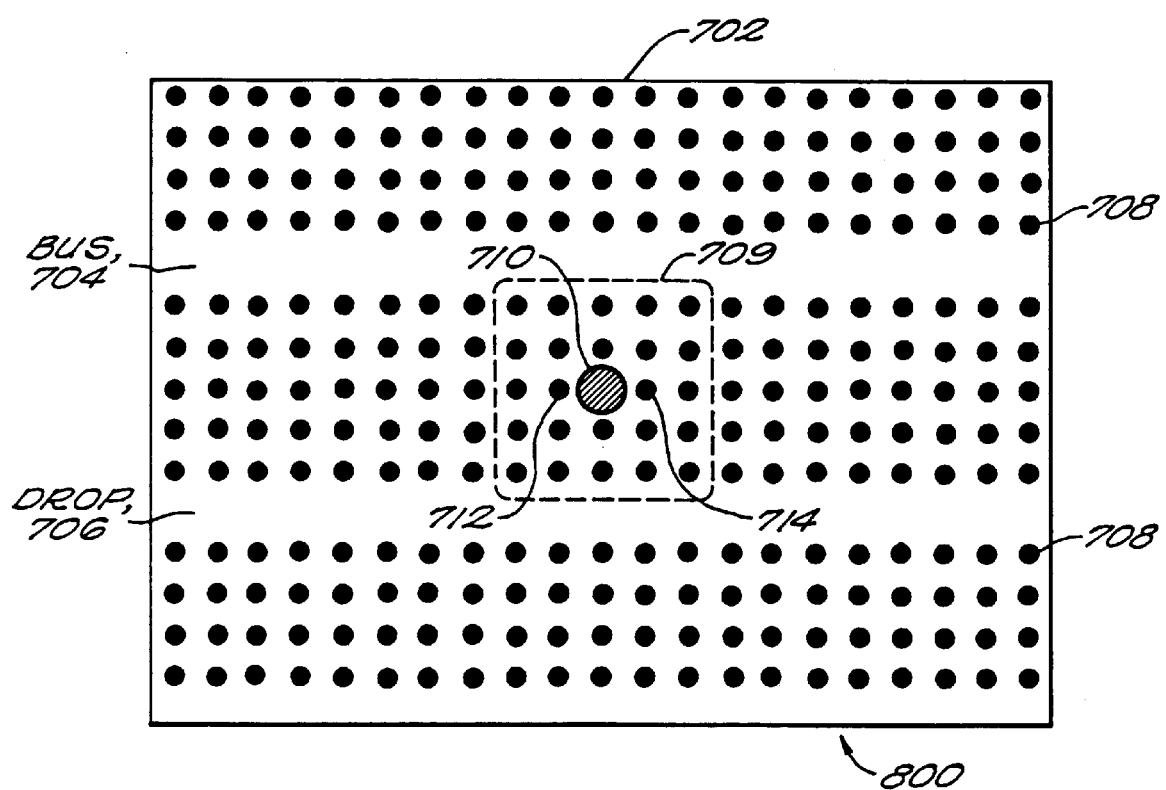
FIG. 8 is a plan view diagram of an alternative exemplary embodiment of a resonator-system photonic crystal CDF in accordance with the invention.

FIG. 8 is an alternative exemplary embodiment of a resonator-system photonic crystal CDF 700 in accordance with the invention shown in plan view. The CDF 700 includes a photonic crystal 702 having two waveguides, a bus 704 and a drop 706. The photonic crystal 702 is configured as a square lattice of high-index dielectric posts 708. The posts have a radius of 0.20 a and a dielectric constant of 11.56, where a is the lattice constant. Two rows of posts are removed to form the waveguides. The coupling element between the two waveguides is a resonator-system 709 which consists of a single cavity 710 with two doubly-degenerate modes (i.e. two modes with the same frequency). The cavity is made by increasing the radius of a single post from 0.20 a to 0.60 a. Alternatively, the cavity can be configured by changing the dielectric constant of a single post. For the illustrated embodiment, the dielectric constant would be increased. Also, as described above, the photonic crystal can be fabricated with channels or holes of air or material having a contrasting dielectric constant.

Figure 9:
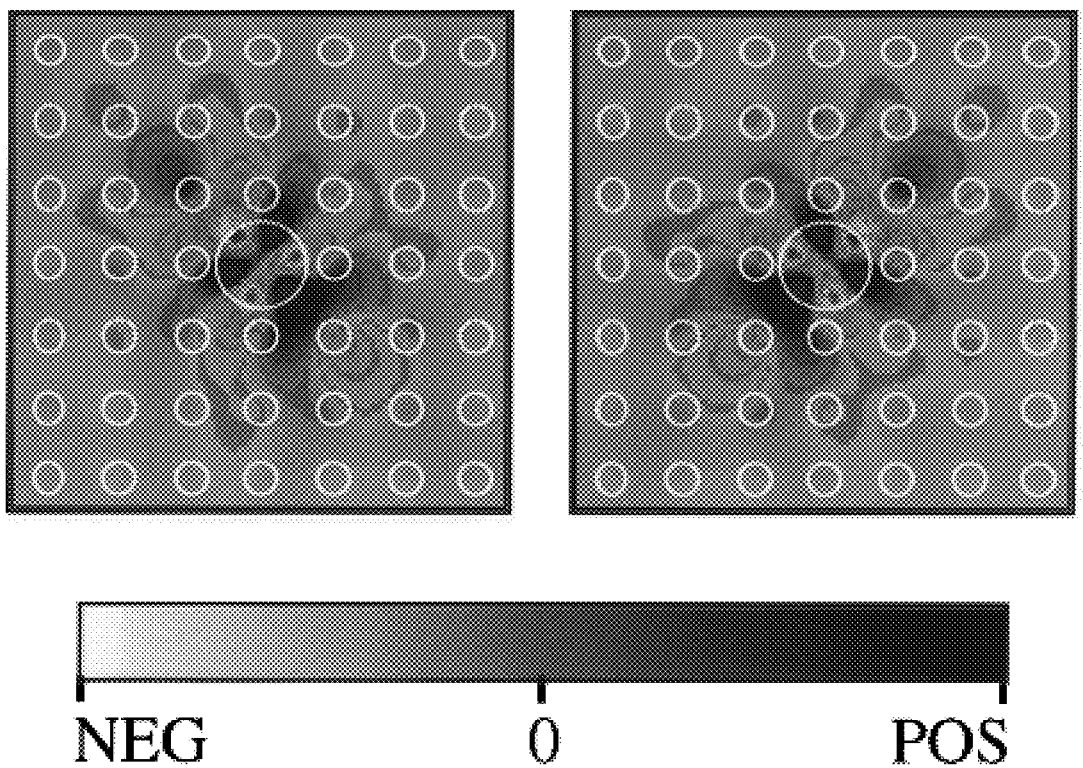
FIG. 9 is a computed electric field pattern of the modes of the resonator-system of the CDF shown in FIG. 8.

FIG. 9 shows a computed electric field pattern of the modes of the resonator-system of the CDF 700 shown in FIG. 8 without the presence of the waveguides. The field pattern illustrates the two doubly-degenerate modes of the resonator-system of the CDF 700 in the absence of the waveguides. Since one of these modes is even and the other odd, the exemplary structure resulting in the field pattern shown in FIG. 9 satisfies the first and second conditions of achieving maximum CDF efficiency, namely the structure possesses at least one mirror plane, and supports at least two resonant modes of opposite symmetry, and the two modes have the same frequency. However, in the presence of waveguides, the degeneracy is broken and the two modes couple differently to the waveguides, hence they have different quality factors. This will have the effect of reducing the transfer efficiency below 100%. The transfer efficiency can be optimized by changing the shape of the cavity, and/or by changing the size or the dielectric constant of neighboring posts so that the resonant modes have substantially the same frequency.

Figure 10:
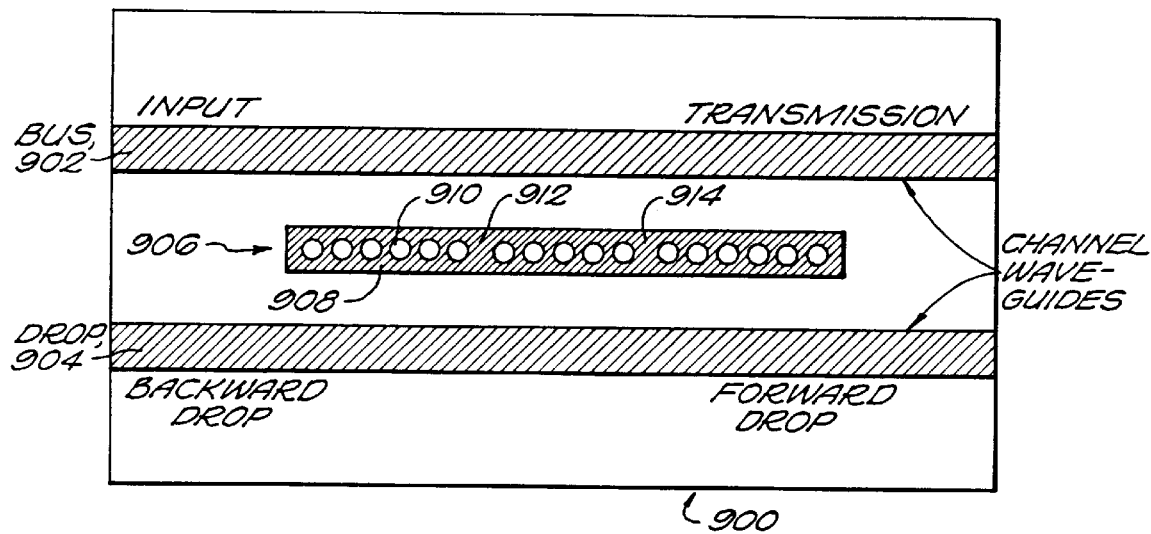
FIG. 10 is a plan view diagram of another alternative exemplary embodiment of a resonator-system CDF in accordance with the invention.

FIG. 10 is another exemplary embodiment of a resonator-system CDF 900 in accordance with the invention. The CDF 900 includes two waveguides, a bus 902 and a drop 904. The waveguides are conventional channel waveguides made of high dielectric material on a substrate such as silicon. A coupling element in the form of a resonator-system 906 is configured from a photonic crystal including a dielectric region 908 with a periodic series of holes 910. Within the array of holes, two defects 912, 914 have been introduced by breaking the periodicity. These two defects serve as cavities. Alternatively, the holes can be replaced with rods as described above.

The efficiencies of all the aforementioned exemplary embodiments of the invention are optimized by configuring and selecting parameters for the geometry and/or the refractive index of the resonator-system. By choosing the appropriate geometries and/or refractive indices for the resonator-system, the frequencies of the degenerate modes will be made to be substantially the same in accordance with the criteria for efficiency. In addition, the geometry and refractive index configuration of the resonator-system are configured so that the decay or dissipation rates (quality factors) of the degenerate modes are substantially the same into the bus and drop waveguides.

Accordingly, the CDF 300 of FIG. 3 can be configured such that the posts 314, 316, 318, and 320 are of varying geometry, i.e., size and shape, with respect to the remaining posts 312, rather than of varying dielectric constant as described. Furthermore, the CDF 700 of FIG. 8 can be optimized by configuring the geometries and/or refractive indices of the posts adjacent to the cavity 710. For example, posts 712 and 714 can be configured to be of a size smaller than the cavity 710, yet larger than the remaining posts 708 in the photonic crystal. Alternatively, the cavity can be configured by cutting or shaving the sides of a single post to form a post with a diamond shape from the top view. As an example of modifying the resonator-system of CDF 900 of FIG. 10 so that the degenerate modes and decay rates match, the dielectric region 908 can be configured to be wider at regions adjacent the defects 912 and 914.

In a further exemplary embodiment, a design for a tunable channel drop filter is considered. In every embodiment described heretofore, the channel frequency was determined by the geometry and dielectric constant of the structure, which is fixed upon fabrication. In order to dynamically change the frequency of the channel (i.e. in order to drop a different frequency using the same device), nonlinear materials can be used. The dielectric constants of the resonator-system or of its surroundings can then be configured using electronic, piezo-electric, thermal, or electromagnetic mechanisms such as, but not limited to, the electro-optic effect, the charge-carrier effect, and the photoionization of DX centers, allowing the CDF to be tuned. An example of tuning the resonance of a resonator-system using nonlinear materials is described by Villeneuve et al., "Single-mode waveguide microcavity for fast optical switching", Optics Letters, Vol. 21, No. 24, 2017 (1996), incorporated herein by reference.

Channel dropping filters are important components of photonic integrated circuits and optical communication systems. These devices allow the access of one or several frequency channels in a WDM signal, without disturbing the other channels. Heretofore, devices have been presented which employ at least two resonant modes as the coupling element between two waveguides. Using two resonances results in a Lorentzian-shaped transfer lineshape, or response function. At the resonant frequency, the transfer efficiency reaches 100%. As the frequency moves away from the resonant frequency, the transfer efficiency decreases rapidly. In a practical WDM system, there are uncertainties in the resonant frequencies of the filters due to fabrication-related disorders. Also signal frequencies fluctuate due to temperature variations in the light sources. A Lorentzian-shaped transfer function requires a high degree of precision in filter fabrication and frequency stability of the light source.

In contrast, a filter structure with a "flat-top" response function can transfer signals of slightly different frequencies with similar efficiencies, and thereby tolerate a larger amount of structure and temperature variations. Another practical consideration for filter designs concerns the "sidewall" of the lineshape. A Lorentzian function falls off as $(\delta\omega)^{-2}$ far away from the resonant frequency, where $\delta\omega$ is the difference between the signal frequency and resonant frequency of the filter. In some practical systems, faster fall-offs are required to reduce the cross talk between nearby frequency channels.

To address these practical considerations, the invention provides designs of channel drop filters with customized response functions. These structures are constructed by introducing several resonances, and by appropriately adjusting the center frequency and the width of these resonances. As exemplary embodiments, filter structures transfer lineshapes are described which have both the desired "flat top" and "sharp sidewall" characteristics. In addition to its response lineshape, this design also offers the possibility of unique switching functionality. While this description focuses on filter structures which have the "flat top" and "sharp sidewall" response characteristics, it will be appreciated by those skilled in the art that other response functions can also be generated using the structures described hereinafter.

Figure 11:
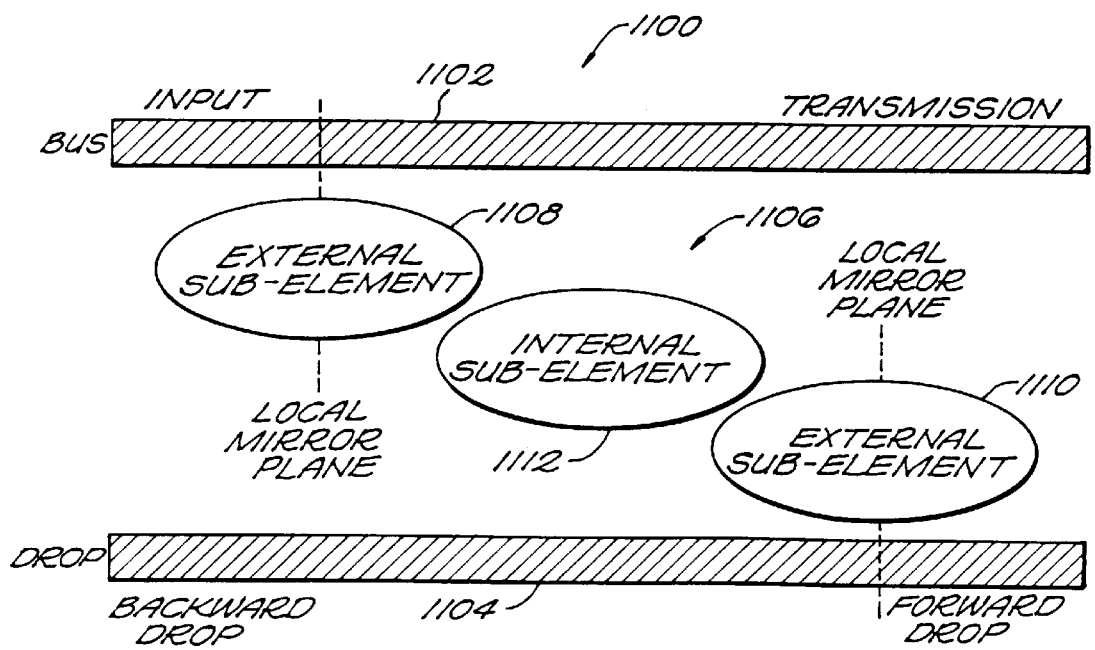
FIG. 11 is a schematic block diagram of a CDF in which the coupling element is composed of external and internal sub-elements.

In order to have transfer lineshapes other than Lorentzian, a structure is needed that supports more than two resonances. FIG. 11 is a schematic block diagram of a resonator-system CDF 1100 in accordance with the invention. The CDF 1100 includes an input waveguide 1102, an output waveguide 1104, and a resonator-system 1106 coupled between the waveguides that supports several resonant modes. In order for signal transfer to occur, it is necessary for the resonator-system to consist of at least one external sub-element, which couples directly into the input waveguide. In the illustrated example, there is provided a bus external sub-element 1108 and a drop external sub-element 1110. In the specific case where only one external sub-element is present, the sub-element should couple into both waveguides.

The resonator-system can also contain internal sub-elements 1112 that do not couple directly into the waveguides, but rather only couple with other resonances. Introducing internal sub-elements allows for greater flexibility in designing filters with arbitrary response lineshapes.

Each sub-element supports one or several local resonant modes. A local resonant mode is an eigenmode of the sub-element under the condition that the sub-element is isolated from other parts of the system. Therefore, a local mode is spatially associated with the sub-element. When interactions are present, the local modes are not necessarily eigenmodes of the entire system. Thus, in a CDF structure, the local modes contain either one or several frequency components. The actual positioning of these frequency components is dependent on the nature of the interactions between the sub-elements. Each sub-element can also have a local symmetry, which is defined as the symmetry that is only associated with the sub-element. The local symmetry need not be identical to the symmetry of the overall structure, referred to hereinafter as the global symmetry.

It is necessary for the external sub-element that couples with the bus waveguide (referred to hereinafter as the bus sub-element) to possess a local mirror-plane symmetry perpendicular to the waveguides, and to support at least two local modes with opposite symmetries, i.e., there should be at least one even and at least one odd local modes. In order to achieve zero reflection, the decaying amplitude of these modes into the backward direction should add up to zero. In the case where only two local modes are present, it is necessary for one to be even, with the other one odd, with respect to the mirror plane. To achieve cancellation of the decaying amplitudes in the backward direction of the bus waveguide, the lineshapes of these two modes must overlap substantially, which in turn requires the corresponding components in these two modes to have substantially the same center frequency and the same width. In the case where more than two local modes are present, it is only necessary for the sum of the decaying amplitudes from all the even modes to cancel the sum of that from all the odd modes.

From energy conservation consideration it follows that, to achieve complete transfer, it is necessary for the energy in the resonator-system to decay into the bus waveguide and the drop waveguide at the same rate. This can be achieved, for example, by having a structure with a mirror plane parallel to the waveguides. To achieve unidirectional transfer into either the forward or the backward direction of the drop waveguide, the external sub-element that couples with the drop waveguide (referred to hereinafter as the drop sub-element) should also have the properties of possessing a local mirror plane and supporting local modes with opposite symmetry.

The transfer lineshape can be customized by adjusting the interaction between the sub-elements, and by adjusting the interaction between the resonator-system and the waveguides. The number of channels that get dropped depends on the frequency spacing between the different channels, and on the width of the CDF transfer function. It may be desirable, in some cases, to increase the width of the transfer function to allow the transfer of more frequency channels. This can be accomplished, for example, by increasing the number of local resonant modes in the resonator system.

To summarize, an embodiment of the invention provides an electromagnetic field frequency filter comprising an input waveguide which carries a signal having a plurality of modes including a desired guided mode and an output waveguide. A resonator-system is coupled between the input and output waveguides which transfers the desired guided mode to the output waveguide and allows transmission of the remaining frequencies through the input waveguides. The resonator-system contains an external sub-element that couples with the input waveguides. The external sub-element possesses a local mirror plane perpendicular to the waveguides, and defines at least two local resonant modes of opposite symmetry with respect to the mirror plane. The resonant modes have components which cancel in the backward direction of the input waveguide, resulting in no reflection.

As an example, consider a structure that can generate a maximum-flat line-shape transfer function. An example of a maximum-flat transfer function $T(\omega)$ is defined as:

$$T(\omega) = \frac{\Upsilon^4}{(\omega - \omega_0)^4 + \Upsilon^4}, \quad (1)$$

where $\omega_0$ is the center frequency and $\gamma$ is the half width at half maximum. Such a transfer function has both the desired "flat top" and "sharp-sidewall" characteristics. To satisfy the requirements described heretofore, consider a structure that possesses two mirror planes, one parallel and the other one perpendicular to the waveguide as in FIG. 12.

Figure 12:
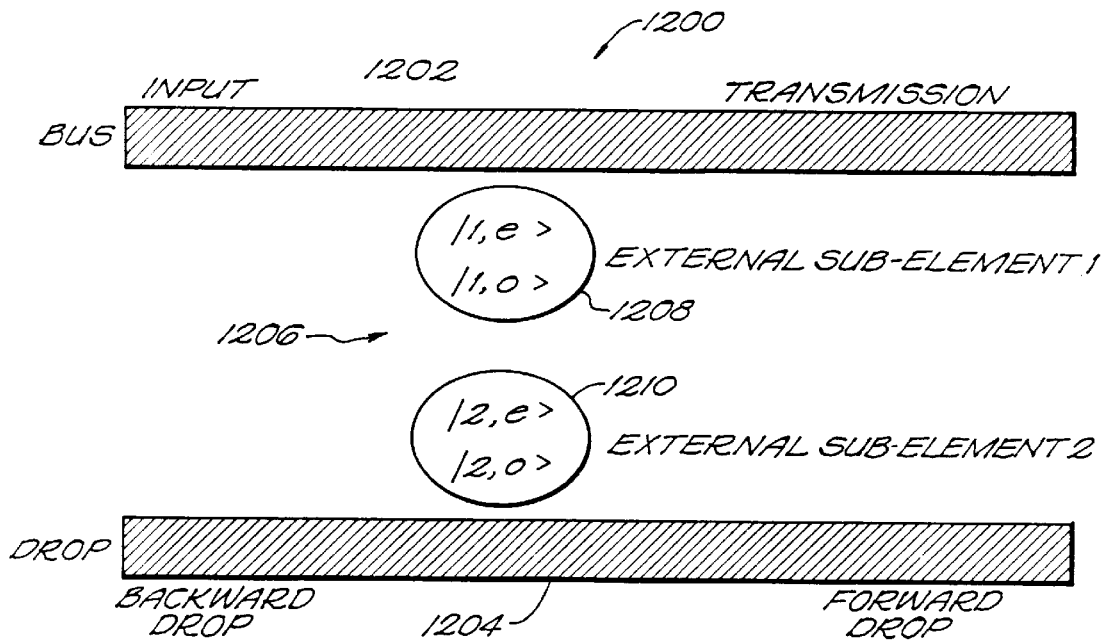
FIG. 12 is a schematic block diagram of a resonator-system CDF with two external sub-elements.

FIG. 12 is a schematic block diagram of a resonator-system CDF 1200. The CDF 1200 has an input waveguide 1202, an output waveguide 1204, and a resonator-system 1206 consisting of two external sub-elements 1208, 1210, and no internal sub-element. Each of the external sub-elements is made up of two cavities (not shown) adjacent to a waveguide and supports two local resonant modes. The sub-element 1208, which couples with the input waveguide 1202, supports an even local mode labelled |1,e>, and an odd local mode labelled |1,o>. The even and odd properties are defined with respect to the mirror plane perpendicular to the waveguides, which in this example is also the local mirror plane of the sub-elements.

Due to the interaction between the two sub-elements, these local modes are not eigenstates of the overall structure. The four eigenstates of the structure possess different symmetry properties with respect to the two mirror planes and are labelled according to their symmetry properties. The state |even-odd>, for example, is even with respect to the mirror plane parallel to waveguide, and odd with respect to the mirror plane perpendicular to the waveguide. Each eigenstate has a Lorentzian lineshape, and is characterized by its center frequency and width.

The local modes can be expanded in terms of the eigenstate of the system. In the case of sub-element 1208, for example, $$|1, e\rangle = \frac{1}{\sqrt{2}}(|\text{even}-\text{even}\rangle + |\text{odd}-\text{even}\rangle) \quad (2)$$

$$|1, o\rangle = \frac{1}{\sqrt{2}}(|\text{even}-\text{odd}\rangle + |\text{odd}-\text{odd}\rangle). \quad (3)$$

From such an expansion, it will be understood that the lineshape of each local mode is made up of a sum of two Lorentzian functions. In order to achieve zero reflection, these two lineshapes must cancel. Cancellation can be achieved in one of two ways:

Possibility 1:

$$\omega_{even-even} = \omega_{odd-even} = \omega_1, \quad (4)$$

$$\omega_{even-odd} = \omega_{odd-odd} = \omega_2, \quad (5)$$

$$\gamma_{even-even} = \gamma_{odd-even} = \gamma_{even-odd} = \gamma_{odd-odd} = \gamma; \quad (6)$$

Possibility 2:

$$\omega_{even-even} = \omega_{odd-odd} = \omega_1, \quad (7)$$

$$\omega_{even-odd} = \omega_{odd-even} = \omega_2 \quad (8)$$

$$\gamma_{even-even} = \gamma_{odd-even} = \gamma_{even-odd} = \gamma_{odd-odd} = \gamma; \quad (9)$$

where each $\omega$ is the center frequency for the corresponding eigenmode, and each $\gamma$ is the width. In the first scenario, the wave is transferred along the forward direction of the drop waveguide, while in the second scenario the wave is transferred along the backward direction of the drop waveguide.

To achieve a maximum-flat transfer lineshape in both scenarios, the coupling strength between the two sub-elements is adjusted. Such coupling has the effect of splitting the even and odd eigenmodes with respect to the mirror plane parallel to the waveguides. In the case where the frequency splitting is substantially equal to twice of the width of the eigenstates, i.e., $$\omega_1 - \omega_2 = 2\gamma, \quad (10)$$

the structure displays a maximum-flat transfer function.

In addition, the transfer can be entirely eliminated by imposing all four states to have the same frequency and the same width, i.e., $$\omega_{even-even} = \omega_{odd-even} = \omega_{even-odd} = \omega_{odd-odd} \quad (11)$$

$$\gamma_{even-even} = \gamma_{odd-even} = \gamma_{even-odd} = \gamma_{odd-odd} \quad (12)$$

In order to "switch" the transfer from the forward direction to the backward direction, or to eliminate the transfer, one needs to shift the resonant frequency on the order of one width of a resonance peak, which can be as small as one-thousandth of the center frequency. Such a frequency shift is readily achievable using non-linear effects such as, but not limited to, the Kerr effect in semiconductor materials.

Figure 13:
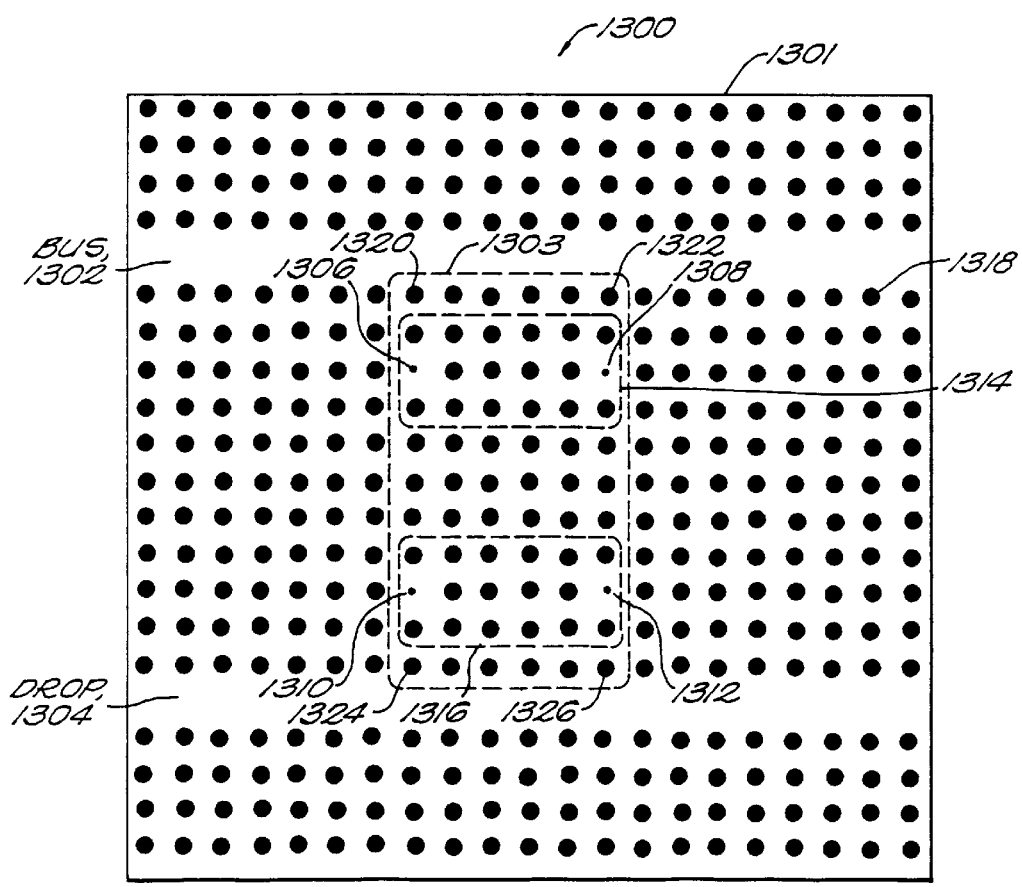
FIG. 13 is a plan view diagram of an exemplary embodiment of a resonator-system photonic crystal CDF with four point defects in accordance with the invention.

FIG. 13 is a plan view diagram of another exemplary embodiment of a resonator-system photonic crystal CDF 1300. The CDF 1300 includes a photonic crystal 1301 having two waveguides, a bus 1302 and a drop 1304. The photonic crystal 1301 is configured as a square lattice of high-index dielectric posts 1318. The posts have a radius of 0.20 a and a dielectric constant of 11.56, where a is the lattice constant. Two rows of posts are removed to form the waveguides.

The coupling element between the two waveguides is a resonator-system 1303 which consists of four point defects defining microcavities 1306, 1308, 1310, 1312. The microcavities are made, for example, by decreasing the radius of the four posts from 0.20 a. Alternatively, the cavity can be configured by changing the dielectric constant of the four posts. Also, as described above, the photonic crystal can be fabricated with channels or holes of air or material having a contrasting dielectric constant.

The microcavities are grouped into two external sub-elements, a bus sub-element 1314 and a drop sub-element 1316. These sub-elements possess a local mirror plane symmetry perpendicular to the waveguides which, in the illustrated embodiment, is also the mirror plane of the overall structure. There is no internal sub-element in this geometry. The cavities are five lattice constants apart and two lattice constants away from one of the waveguides. Each cavity supports a localized monopole state which is singly degenerate. The even and odd states, as described, are composed of linear combinations of these monopoles.

The quality factor of these symmetric states can be made equal provided that the wavevector k of the guided mode satisfies the relation $k \cdot d = n\pi + \pi/2$, where d is the distance between the defect in the direction parallel to the waveguides, and n is an integer. This condition can be met by separating the defects by five lattice constants, and by choosing the size and dielectric constant of the defect posts in such a way that the guided mode at the resonant frequency has a wavevector of $0.25(2\pi)a^{-1}$.

The monopoles are coupled indirectly through the waveguides, and directly through the photonic crystal along the x-direction. Each coupling mechanism splits the frequencies (i.e. breaks the degeneracy) of states of different symmetries with respect to the mirror plane perpendicular to the waveguide, but with an opposite sign. The exact cancellation between the two coupling mechanisms is ensured by changing the dielectric constant, size and/or shape of selected rods, such as posts 1320,1322,1324,1326, in the photonic crystal from 11.56 to 7.5, as shown in FIG. 13. The distance between the cavities in the y-direction is chosen to be four lattice constant to ensure the appropriate splitting in frequency between the states with opposite symmetries with respect to the mirror plane parallel to the waveguides.

Figure 14:
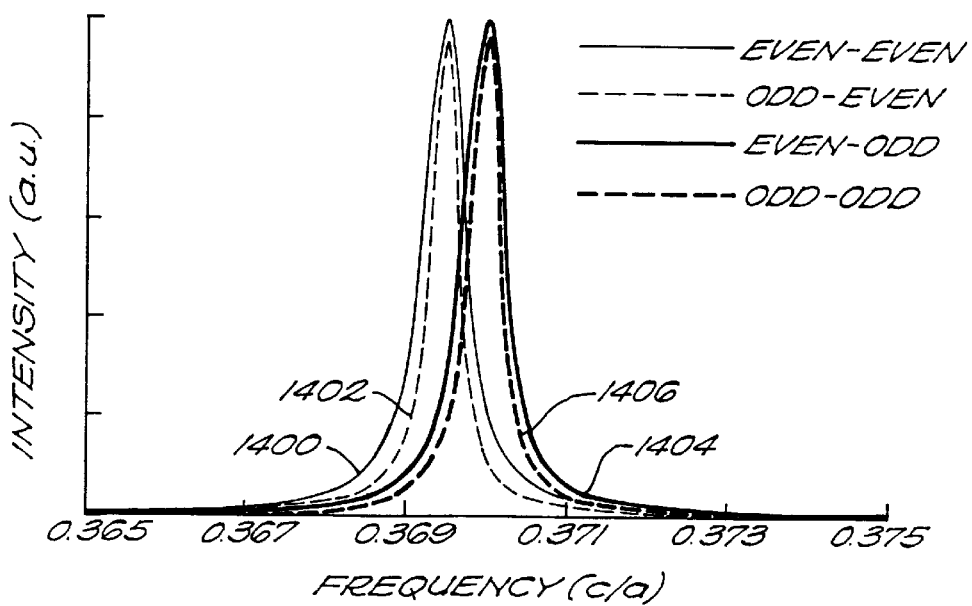
FIG. 14 is a graph of the frequency spectrum of the even-even, odd-even, even-odd, and odd-odd modes for the CDF of FIG. 13.

The filter response of the structure shown in FIG. 13 can be computed using a finite-difference time-domain scheme. A pulse is sent down one of the waveguides and excites the resonant states. These resonant states then decay exponentially into the waveguides. By Fourier transforming the decaying amplitudes, the frequency spectrum of all the symmetric states can be found, each with a Lorentzian lineshape. FIG. 14 is a graph of the frequency spectrum of the even-even, odd-even, even-odd, and odd-odd modes for the CDF 1300 of FIG. 13. As required, the lineshapes of the even-even 1400 and odd-even 1402 states overlap almost completely, as well as the lineshapes of the even-odd 1404 and odd-odd 1406 states. The center frequency of the even-even state is separated with the center frequency of the even-odd state by twice the width of the resonant peak, as desired.

Figure 15A:
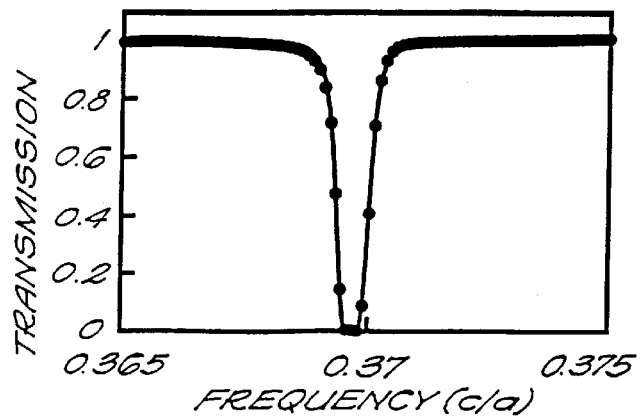
FIGS. 15A–15C are graphs of the intensity spectrum of a transmitted signal in the bus, the intensity spectrum of a transmitted signal in the forward drop, and the intensity spectrum of a transmitted signal in the backward drop, respectively, of the CDF of FIG. 13.
Figure 15B:
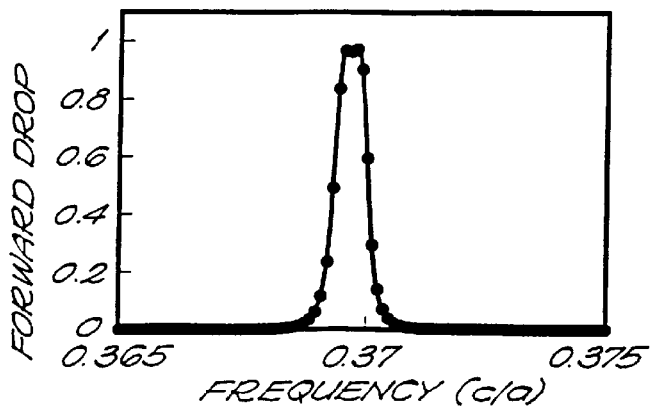
Figure 15C:
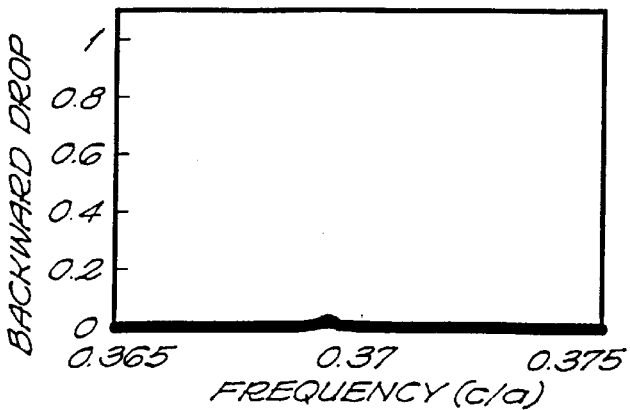

The spectra of the signals in the forward and backward drops are shown in FIGS. 15A–15C along with the spectrum of the transmitted signal. FIGS. 15A–15C are graphs of the intensity spectrum of a transmitted signal in the bus, the intensity spectrum of a transmitted signal in the forward drop, and the intensity spectrum of a transmitted signal in the backward drop, respectively, of the CDF 1300 of FIG. 13. The transmission is close to 100% over the entire spectrum, except in the neighborhood of the center frequency, where it drops to 0% (FIG. 15A). The forward drop reaches a maximum close to 99% at the center frequency (FIG. 15B). The backward drop shows almost complete absence of signal (FIG. 15C). The transfer lineshape does indeed show the maximum-flat characteristics, i.e., flattening of the top at the resonance peak and sharp fall-off of the transfer amplitude away from the center frequency.

Figure 16:
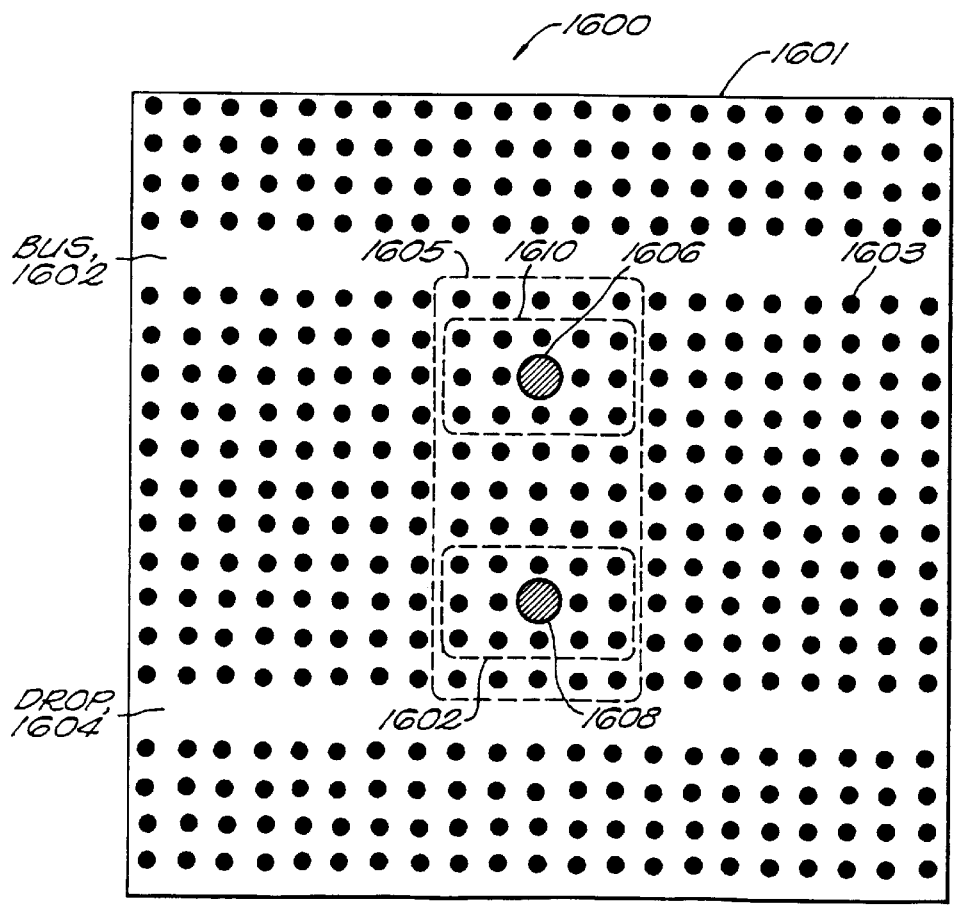
FIG. 16 is a plan view diagram of an exemplary embodiment of a resonator-system photonic crystal CDF with two point defects aligned perpendicularly to the associated waveguides.

FIG. 16 is a plan view diagram of another exemplary embodiment of a resonator-system photonic crystal CDF 1600. The CDF 1600 is configured from a photonic crystal 1601 of a square lattice of high-index dielectric posts 1603, with a bus waveguide 1602 and a drop waveguide 1604. In this embodiment, the coupling element between the two waveguides is a resonator-system 1605 which consists of two point defects defining two cavities 1606,1608, each supporting doubly degenerate modes (i.e. two modes with the same frequency). The respective centers of the point defects are aligned to an axis that is perpendicular to the waveguides. Each of the cavities defines an external sub-element, a bus sub-element 1610 and a drop sub-element 1612. There is no internal sub-element in this structure.

The cavities 1606,1608 are made by increasing the radius of two rods from 0.20 a to 0.60 a. The symmetric modes are composed of linear combinations of all the modes. The frequencies of the symmetric modes can be tuned by changing the shape and dielectric constant of the defect rods, and/or the rods that are in the nearest neighbor position to the defects. In addition, the splitting of frequencies between modes with different symmetries with respect to the mirror plane parallel to the waveguides can be adjusted by changing the distance between the defects, and by changing the shape or dielectric constants of the rods lying between the cavities. Using these tuning mechanisms, the resonant frequencies can be placed at approximate positions to achieve a complete transfer into the forward direction with a maximum flat transfer lineshape.

Figure 17:
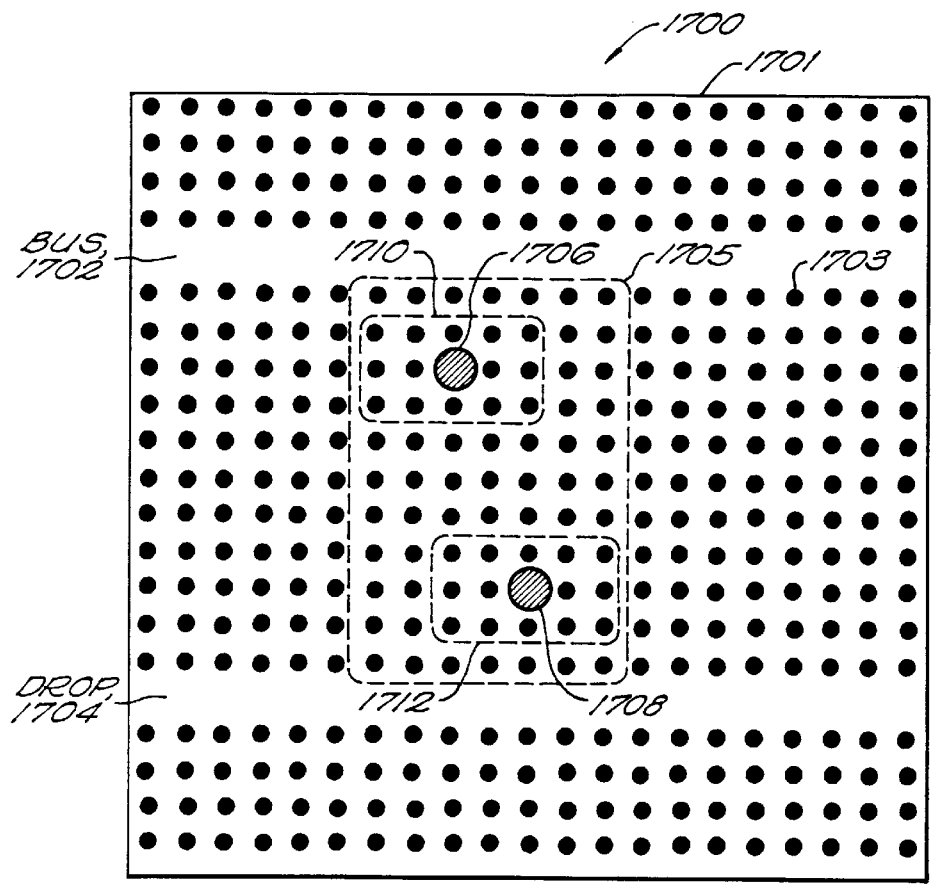
FIG. 17 is a plan view diagram of an exemplary embodiment of a resonator-system photonic crystal CDF with two point defects having local symmetry but not global symmetry.

FIG. 17 is a plan view diagram of another exemplary embodiment of a resonator-system photonic crystal CDF 1700. The CDF 1700 is configured from a photonic crystal 1701 of a square lattice of high-index dielectric posts 1703, with a bus waveguide 1702 and a drop waveguide 1704. In this embodiment, the coupling element between the two waveguides is a resonator-system 1705 which consists of two point defects defining two cavities 1706,1708.

The CDF 1700 contains two external sub-elements. Each of the cavities defines an external sub-element, a bus sub-element 1710 and a drop sub-element 1712. There is no internal sub-element in this structure. Each of these sub-elements possesses a local mirror plane, and consists of a single defect that supports two local resonances with opposite symmetries with respect to the local mirror plane. In contrast to the previous embodiments, there is no global mirror plane in the structure. In order to achieve complete transfer, the lineshapes of the even and the odd local modes need to be cancelled. This can be achieved, for example, by changing the dielectric constant or the size of the posts adjacent to the cavities. By adjusting the dielectric constant or the size of the rods lying between the cavities, the coupling between the local resonances in the two cavities can be adjusted.

Figure 18:
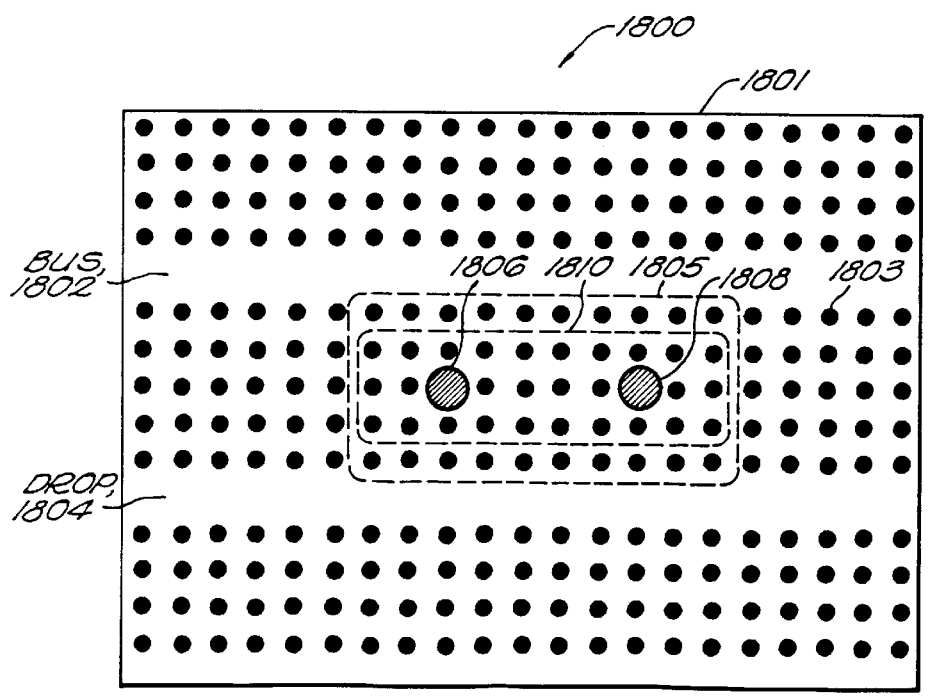
FIG. 18 is a plan view diagram of an exemplary embodiment of a resonator-system photonic crystal CDF with two point defects aligned parallel to the associated waveguides.

FIG. 18 is a plan view diagram of another exemplary embodiment of a resonator-system photonic crystal CDF 1800. The CDF 1800 is configured from a photonic crystal 1801 of a square lattice of high-index dielectric posts 1803, with a bus waveguide 1802 and a drop waveguide 1804. In this embodiment, the coupling element between the two waveguides is a resonator-system 1805 which consists of two point defects defining two cavities 1806,1808, each supporting two doubly degenerate modes (i.e. two modes with the same frequency). The respective centers of the point defects are aligned along an axis that is parallel to the waveguides. Each of the cavities defines a single external sub-element 1810. There is no internal sub-element in this structure.

The geometry of CDF 1800 introduces an indirect coupling pathway between the cavities, which could be used to tune the resonant frequencies of the symmetric modes, in addition to the other mechanisms present in the previous embodiments. With this additional mechanism, a complete transfer into either the forward or the backward direction can be achieved. Also the transfer can be eliminated completely.

Figure 19:
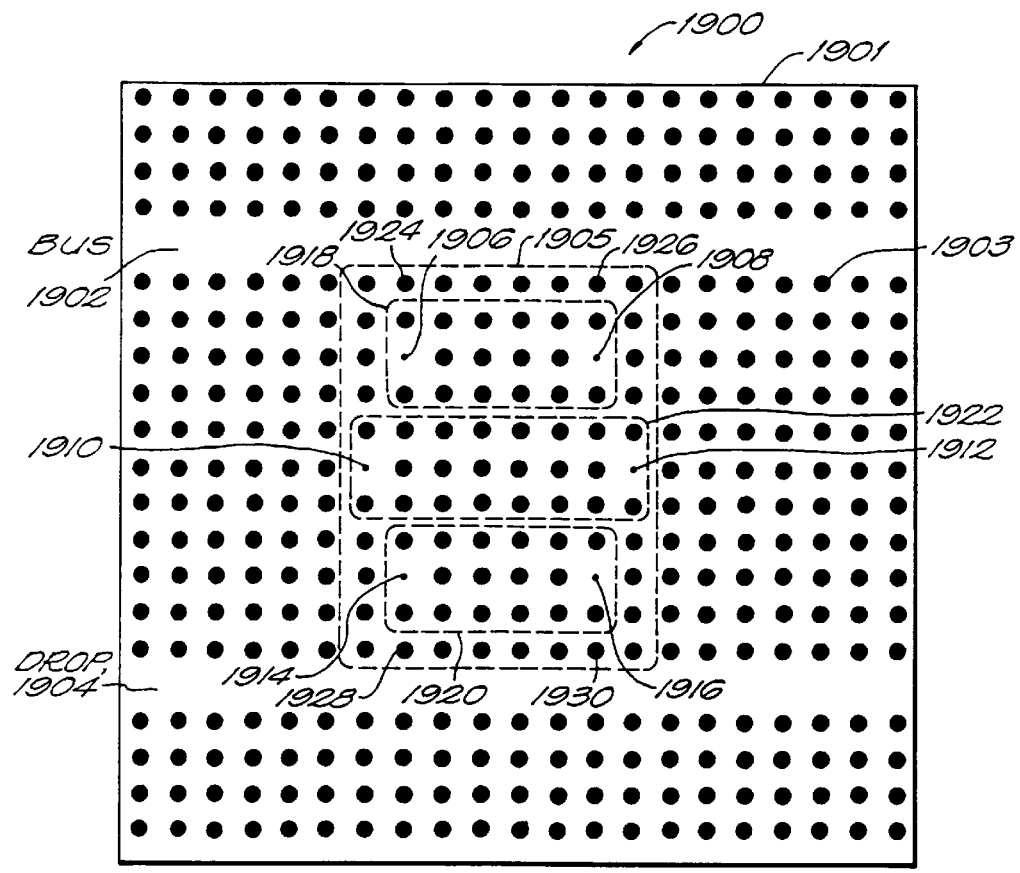
FIG. 19 is a plan view diagram of an exemplary embodiment of a resonator-system photonic crystal CDF with six point defects.

FIG. 19 is a plan view diagram of another exemplary embodiment of a resonator-system photonic crystal CDF 1900. The CDF 1900 is configured from a photonic crystal 1901 of a square lattice of high-index dielectric posts 1903, with a bus waveguide 1902 and a drop waveguide 1904. In this embodiment, the coupling element between the two waveguides is a resonator-system 1905 which consists of six point defects defining six cavities 1906,1908,1910,1912, 1914,1916, each of which supports a singly degenerate resonance.

The CDF 1900 contains two external sub-elements. The cavities 1906 and 1908 define an external bus sub-element 1918, and the cavities 1914 and 1916 define an external drop sub-element 1920. The two cavities 1910 and 1912 define an internal sub-element 1922. The two cavities 1910,1912 in the center do not couple directly to the waveguides, but rather only couple to the waveguides through other cavities. This structure is an example of a CDF with an internal sub-element 1922. In this case, the presence of the internal sub-element does not affect the overlap of the even and odd local states of the external sub-elements, but rather only changes the frequencies of the even and odd states. By adjusting the distance between the cavities and the dielectric constants of the rods lying between the cavities, more complex lineshapes such as the Butterworth function can be achieved. In addition, the exact cancellation between the coupling mechanisms is ensured by changing the dielectric constant, size and/or shape of selected rods, such as posts 1924,1926,1928,1930 in the photonic crystal.

Figure 20:
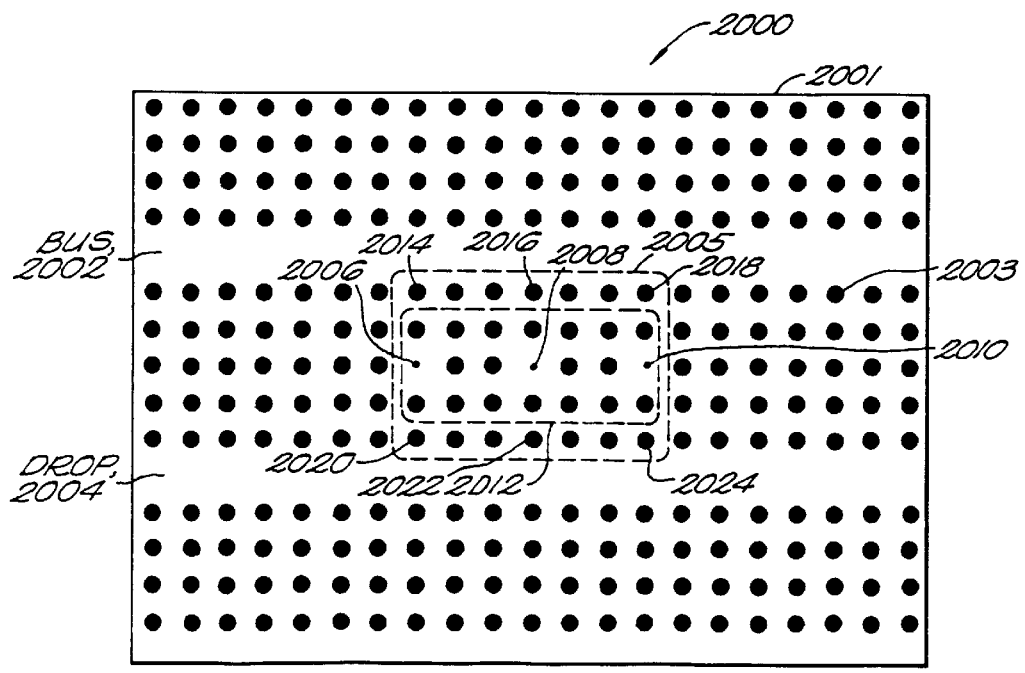
FIG. 20 is a plan view diagram of an exemplary embodiment of a resonator-system photonic crystal CDF with three cavities.

FIG. 20 is a plan view diagram of another exemplary embodiment of a resonator-system photonic crystal CDF 2000. The CDF 2000 is configured from a photonic crystal 2001 of a square lattice of high-index dielectric posts 2003, with a bus waveguide 2002 and a drop waveguide 2004. In this embodiment, the coupling element between the two waveguides is a resonator-system 2005 which consists of three point defects defining three cavities 2006,2008,2010. The respective centers of the point defects are aligned along an axis that is parallel to the waveguides. The cavities define a single external sub-element 2012. There is no internal sub-element in this structure.

In contrast to the previously illustrated embodiments, the external sub-element 2012 of this structure contains three local resonances, one odd, the other two even, with respect to the mirror plane perpendicular to the waveguides. Since there is only one external sub-element and no internal sub-element, these local modes are eigenstates of the entire filter structure. Complete transfer can occur if the lineshape function of the odd mode cancels the sum of the lineshape of the two even modes. This can be achieved by having the center frequency of the odd mode lying between the center frequencies of the two even modes, and by having the width of the odd mode larger than the width of the two even modes. The relative position of the frequencies of the even and odd modes can be adjusted by changing the dielectric constant or the size of the center cavity, since the even modes have a large amplitude while the odd mode has a small amplitude in the center cavity. The width of these modes can be adjusted by changing the distance between the cavities. The exact cancellation in the coupling mechanism is ensured by changing the dielectric constant, size and/or shape of selected rods, such as posts 2014,2016,2018,2020, 2022,2024, in the photonic crystal. Preferably, the posts 2016 and 2022 will be altered in a manner different than the alteration of the remaining posts 2014,2018,2020,2024.

Figure 21:
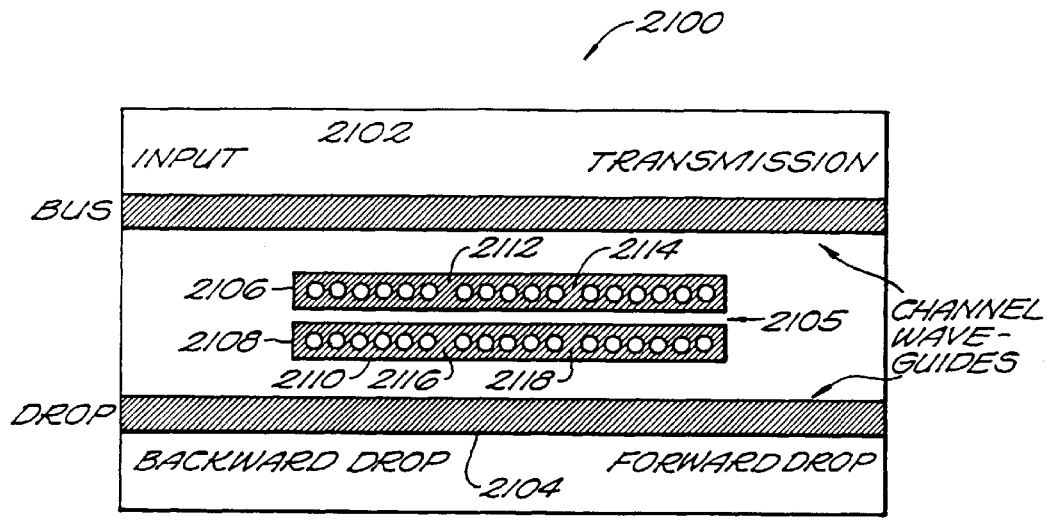
FIG. 21 is a plan view diagram of another alternative exemplary embodiment of a resonator-system CDF utilizing conventional channel waveguides with a photonic crystal having four microcavities.

FIG. 21 is a plan view diagram of another alternative exemplary embodiment of a resonator-system CDF 2100. The CDF 2100 utilizes conventional channel bus 2102 and drop 2104 waveguides made of high dielectric material with a resonator-system 2105 configured from a photonic crystal. The CDF 2100 is a case with radiation losses.

The resonator-system 2105 is made of two dielectric regions 2106,2108, each consisting of a periodic series of holes 2110. For each region, within the array of holes, two defects 2112,2114/2116,2118 have been introduced by breaking the periodicity. These defects act like microcavities. In contrast to the two previously illustrated embodiments, where there were no radiation losses, the two defect states decay into both radiation modes and waveguide modes. The condition for achieving maximum transfer to the forward direction with the maximum-flat lineshape, in the presence of radiation loss, therefore becomes:

$$\omega_{even-even} = \omega_{odd-even} = \omega_{even} \tag{13}$$

$$\omega_{even-odd} = \omega_{odd-odd} = \omega_{odd} \tag{14}$$

$$\gamma_{even-even} = \gamma_{odd-even} = \gamma_{even-odd} = \gamma_{odd-odd} \tag{15}$$

$$\gamma^*_{even-even} = \gamma^*_{odd-even} = \gamma^*_{even-odd} = \gamma^*_{odd-odd} \tag{16}$$

$$\omega_{even} - \omega_{odd} = 2\gamma \tag{17}$$

where each $\omega$ is the center frequency for the corresponding eigenmode, each $\gamma$ is the width of the resonance peak, and each $\gamma^*$ is the width of the resonance peak due only to the energy dissipation into the waveguides.

It will be appreciated by those skilled in the art that the number of channels that get dropped depends on the frequency spacing between the different channels, and on the width of the CDF transfer function. It may be desirable, in some cases, to increase the width of the transfer function to allow the transfer of more frequency channels. This can be accomplished, for example, by increasing the number of local resonant modes in the resonator system.

Highly efficient channel drop filter structures have now been presented. These structures allow the complete transfer of one or several frequency channels in a wavelength division multiplexed (WDM) signal from the bus waveguide through a coupling element to the drop waveguide, without disturbing the other channels. Tuning mechanisms have also been introduced to shift the resonant frequencies of the coupling element, which allows dynamic selection of frequency channels. In addition to such channel-selection capability, however, it is also preferable in a practical WDM system to be able to switch on and off the transfer of a frequency channel. Ideally, in an "on" state, the frequency channel is completely transferred from the bus to the drop waveguide, while in an "off" state, the frequency channel remains unperturbed in the bus waveguide. It is conceivable to achieve such on/off functionality using the frequency tuning mechanism presented heretofore. However, to turn off the device, the resonant frequencies of the coupling element must be shifted out of the entire frequency range of the WDM signal. Such a frequency shift tends to require large switching power, and is not very practical.

Figure 22A:
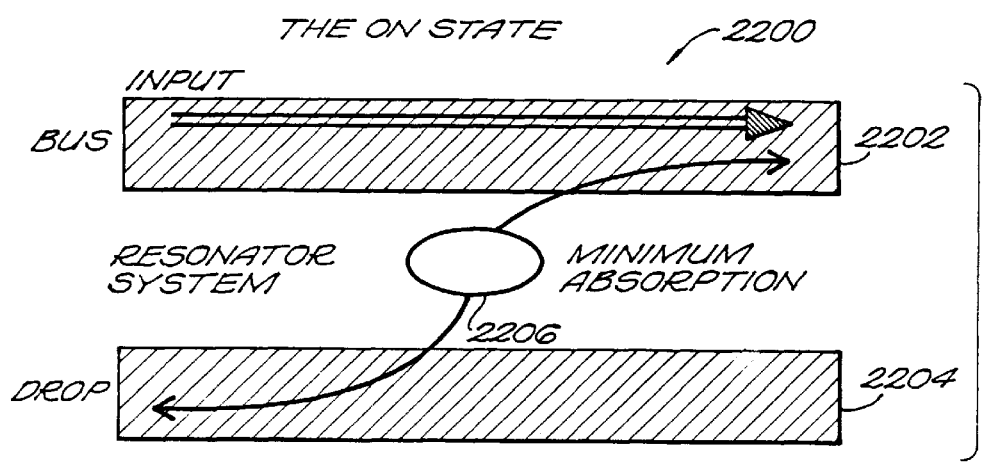
FIGS. 22A and 22B are functional block diagrams of a channel drop filter utilizing the mechanism of absorption-induced switching in the "on" state and "off" state, respectively.
Figure 22B:
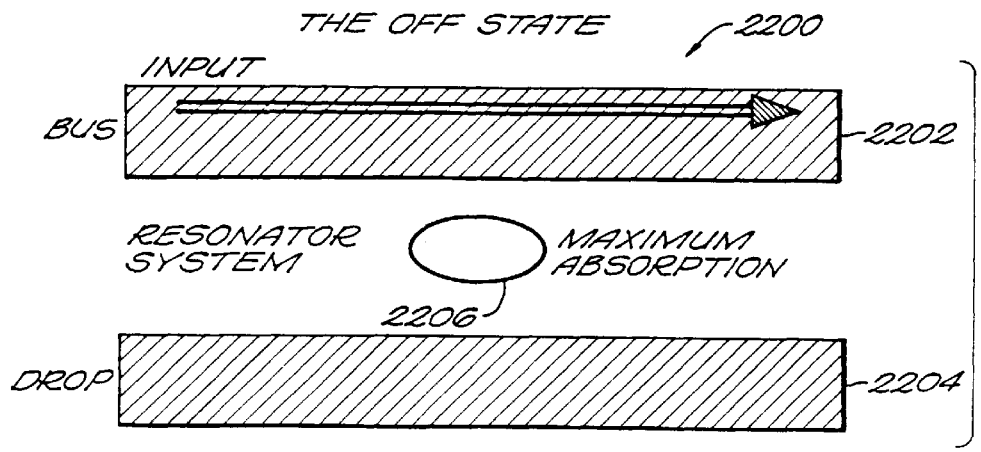

In accordance with further embodiments of the invention, there now will be described the use of an absorption-induced switching effect to achieve the on-off functionality. The basic operating principle of this effect is illustrated in FIGS. 22A and 22B. FIGS. 22A and 22B are functional block diagrams of a channel drop filter 2200 utilizing the mechanism of absorption-induced switching in the "on" state and "off" state, respectively. The filter 2200 includes a bus waveguide 2202, a drop waveguide 2204 and a resonator system 2206 which serves as the coupling element as previously described. A material with a tunable absorbing coefficient is incorporated in the coupling element. Depending on the value of the absorption coefficient, the filter is switched between an "on" state as shown in FIG. 22A and an "off" state as shown in FIG. 22B.

In an "on" state, the material has a minimal absorption coefficient and the structure behaves as a regular channel drop filter, as described previously. At the resonant frequency, the power is completely transferred from the bus waveguide to the drop waveguide. The transmitted amplitude in the bus waveguide drops to zero due to destructive interference between the decaying amplitudes from the coupling element and the incoming wave. The power is transferred into the drop waveguide through the decaying amplitude from the coupling element. For illustrative purposes, FIG. 22A shows transfer along the backward direction in the drop waveguide. The same applies equally to the case where the power is transferred along the forward direction.

In an "off" state, the absorbing material in the cavity is tuned to have maximum absorption coefficient. Consequently, the resonances in the coupling element are spoiled and the decaying amplitudes from the coupling element are eliminated. It is no longer necessary for the frequencies and decay rates of the resonant modes to be substantially the same. In the drop waveguide, since the wave power originates entirely from the decaying amplitudes, the power transfer is completely turned off. In the bus waveguide, on the other hand, with the absence of the decaying amplitude, there is no longer destructive interference. Hence, the transmission of the incoming wave will stay close to 100% over the entire frequency range as shown in FIG. 22B.

It will be appreciated that in both the "off" and "on" states, there is minimal signal loss due to absorption. In the "on" state, the absorption coefficient is minimized, and by design there should be minimal losses associated with absorption. In such a state, photons possess a large field amplitude inside the coupling element. In the "off" state, on the other hand, by introducing a large absorption coefficient, the resonances in the coupling elements are spoiled. The photons no longer possess a large field amplitude in the coupling element. The only absorption loss is due to the tunneling effect through the exponential tail of the waveguide mode. Such a tunneling effect is minimized by increasing the distance, and hence the tunneling barrier, between the waveguide and the coupling element.

Quantitatively, the response spectra of the switch is determined by the internal decaying rate $v^{in}$ and the external decaying rate $v^{ex}$ of the resonances. The internal decaying rate is associated with cavity loss. When cavity loss is induced by material absorption, the internal decaying rate is defined by:

$$v^{in} = \alpha \cdot \frac{c}{n} \tag{18}$$

where α is the absorption coefficient of the materials, c is the speed of light in vacuum, and n is the index of refraction. The external rate, on the other hand, is defined by the rate at which photons tunnel into the waveguide and escape from the resonator system.

The decaying rates are related to the internal and external quality factors through the relations:

$$Q^{in} = \frac{\omega}{v^{in}}, \tag{19}$$

$$Q^{ex} = \frac{\omega}{v^{ex}}, \tag{20}$$

where ω is the resonant frequency. The quality factors $Q^{in}$ and $Q^{ex}$ measure the number of optical cycles photons spend in the resonator before being absorbed or leaking out, respectively.

A detailed quantitative analysis can be constructed by identifying the properties of the states of each individual component, i.e., the propagating state in the waveguides, and the resonant states in the coupling element. A Hamiltonian matrix is then set up to describe the interactions between these states. The transfer characteristics can be extracted from such a Hamiltonian matrix using a Green function's approach. As an example, in the specific case where only a single pair of states is present in the coupling element, and where the states possess opposite symmetry with respect to the mirror plane parallel to the waveguides, the following transfer spectra exist (the subscripts e and o label the even and odd states, respectively):

Transmission coefficient:

$$T_{bus} = \left(1 - \frac{1}{2} \cdot \frac{iv_e^{ex}}{\omega - \varpi_e + iv_e^{ex} + iv_e^{in}} - \frac{1}{2} \cdot \frac{iv_o^{ex}}{\omega - \varpi_o + iv_o^{ex} + iv_o^{in}}\right)^2 \tag{21}$$

Reflection coefficient:

$$R_{bus} = \left(-\frac{1}{2} \cdot \frac{iv_e^{ex}}{\omega - \varpi_e + iv_e^{ex} + iv_e^{in}} + \frac{1}{2} \cdot \frac{iv_o^{ex}}{\omega - \varpi_o + iv_o^{ex} + iv_o^{in}}\right)^2 \tag{22}$$

Transfer coefficient in the forward direction:

$$T_{fdrop} = \left(\frac{1}{2} \cdot \frac{iv_e^{ex}}{\omega - \varpi_e + iv_e^{ex} + iv_e^{in}} - \frac{1}{2} \cdot \frac{iv_o^{ex}}{\omega - \varpi_o + iv_o^{ex} + iv_o^{in}}\right)^2 \tag{23}$$

Transfer coefficient in the backward direction:

$$T_{bdrop} = \left(\frac{1}{2} \cdot \frac{iv_e^{ex}}{\omega - \varpi_e + iv_e^{ex} + iv_e^{in}} + \frac{1}{2} \cdot \frac{iv_o^{ex}}{\omega - \varpi_o + iv_o^{ex} + iv_o^{in}}\right)^2 \tag{24}$$

Of particular interest are two limiting cases. In one limit, $v^{in}$ is much less than $v^{ex}$, ($v^{in} \ll v^{ex}$), i.e., the absorption coefficient of the tunable material in the coupling element is small. $v_e^{in}$ and $v_o^{in}$ can then be ignored in equations (21)–(24). The equations, therefore, describe a channel drop filter response without material absorption. At the resonant frequency, all the power is transferred from the bus waveguide to the drop waveguide. The switch is in an "on" state. In the opposing limit, $v^{in}$ is much greater than $v^{ex}$, ($v^{in} \gg v^{ex}$), i.e., the absorption coefficient of the tunable material in the coupling element is large. From equation (21), the transmission coefficient approaches unity, while the reflection and the transfer coefficients in equations (22)–(24) asymptotically vanishes with increasing $v_e^{in}$ and $v_o^{in}$. Hence, the switch is in an "off" state. The frequency channel of interest remains propagating unperturbed in the bus waveguide. The analytic results indeed confirm the qualitative arguments presented earlier.

Equivalently, due to the relation between the decaying rates and the quality factors (equations (19) and (20)), the two limiting cases can be presented in terms of the internal and external quality factors. The "on" state corresponds to the case when $Q^{in} \gg Q^{ex}$, while the "off" state corresponds to the case when $Q^{in} \ll Q^{ex}$.

In general, the coupling element might support more than two states. Also, the symmetries of these states might be different from those specified above. In these cases, the response spectra will be different from the spectra given by equations (21)–(24). However, the general feature of switching and modulation remains valid. Introduction of absorption in a resonant cavity spoils the resonant state(s) associated with the cavity and prevents the cavity from contributing to the response of the filter structure.

The absorption coefficients can be changed by different means, whether electrical, optical or mechanical. For example, see Soref et al., "Electrooptical Effects in Silicon", IEEE J. Quantum Electron., QE-23, 123 (1987) and Bennett et al., "Carrier-Induced Change in Refractive Index of InP, GaAs, and InGaAsP", IEEE J. Quantum Electron., QE-26, 113 (1987), both incorporated herein by reference. The possibility of using the free carrier absorption effect in semiconductor materials for electromagnetic waves with frequencies lying below the electronic bandgap is presented.

When no optical or electrical excitations are present, the conduction band is empty and the material is transparent, i.e., the absorption coefficient is equal to zero. Electrons can be injected into the conduction band of the semiconductors with either optical excitations at a frequency above the electronic band gap, or electronic excitations such as current injection. Both excitations have the effect of inducing free carrier absorption. In a bulk silicon material, at a wavelength of 1.55 micron, the absorption coefficient can be readily tuned from zero to $10^5$ m$^{-1}$, which corresponds to a change of internal quality factor from infinity to approximately 100. Significant switching action can therefore be achieved in structures with an external quality factor on the order of a thousand or above. It is also noted that as the external quality factor of the resonances increases, the magnitude of the tuning range required for the absorption coefficients decreases.

While all of the previous descriptions have focused on the switching aspect of the device, it will be appreciated to people skilled in the art that a modulator functionality can be achieved using the same device by modulating the absorption coefficients with time. Optical modulators are devices which perform the task of impressing information onto a lightwave signal. As seen from equations (21)–(25), the fraction of power switched between the waveguides depends on the internal quality factor of the resonances, which in turn is determined by the strength of material absorption inside the cavity. For the case of no absorption, the power is completely transferred to the drop waveguide. For sufficiently large absorption, the power remains unperturbed in the bus waveguide and no transfer occurs. For intermediate values of absorption, power is partially transferred to the drop waveguide. Thus, the level of optical intensity in both the bus and the drop waveguides can be modulated by the degree of material absorption inside the cavities.

The general principle for switching and modulation outlined above can be implemented in every embodiment described herein. Rather than discussing the implementation of the on/off functionality in all of the previous embodiments, exemplary embodiments are presented to illustrate the important practical issues.

As a first embodiment, the switching/modulation functionality is incorporated on the photonic crystal channel drop filter structure as shown in FIG. 8. The channel drop filter structure includes a photonic crystal having two waveguides, each formed by removing a row of posts in a photonic crystal. The coupling element between the two waveguides is a resonator-system which consists of a single cavity. The geometrical parameters of the structure have been previously specified. To incorporate the switching/modulation functionalities, materials are introduced into the resonant cavity which have tunable absorbing characteristics.

Figure 23A:
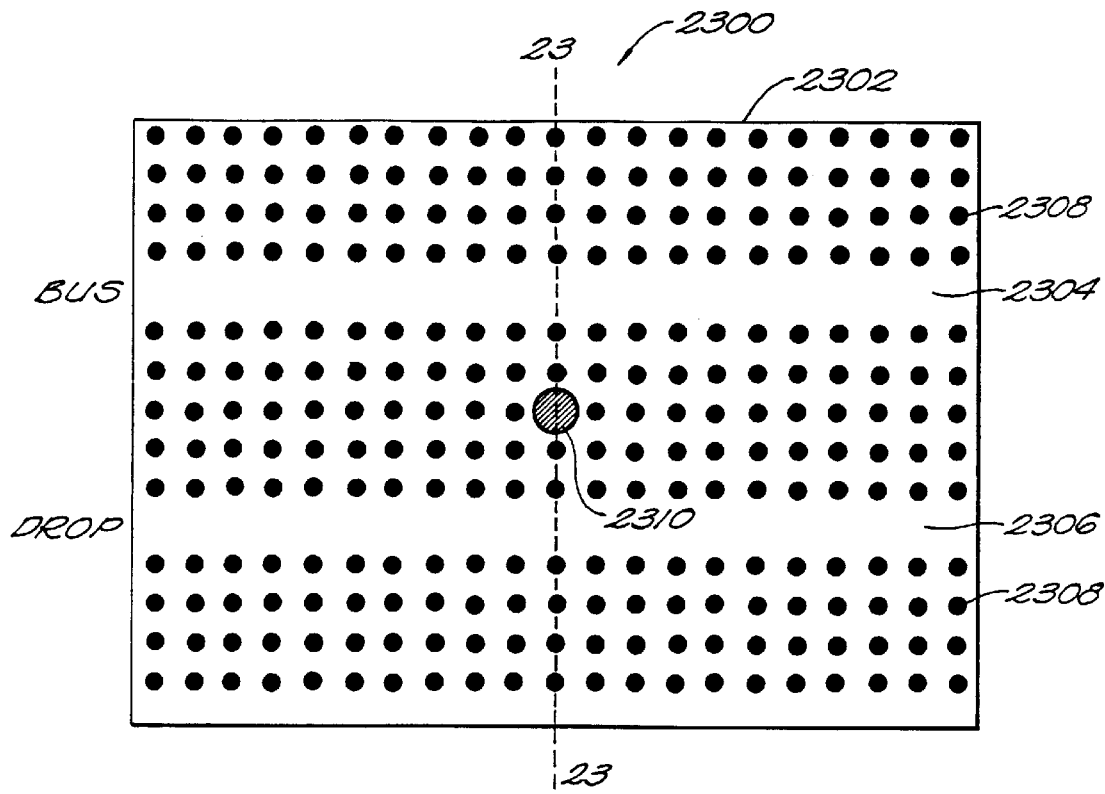
FIGS. 23A and 23B are a plan view and a cross-sectional view taken along line 23—23, respectively, of a photonic crystal resonator-system switch/modulator CDF utilizing an electrode to induce absorption.
Figure 23B:
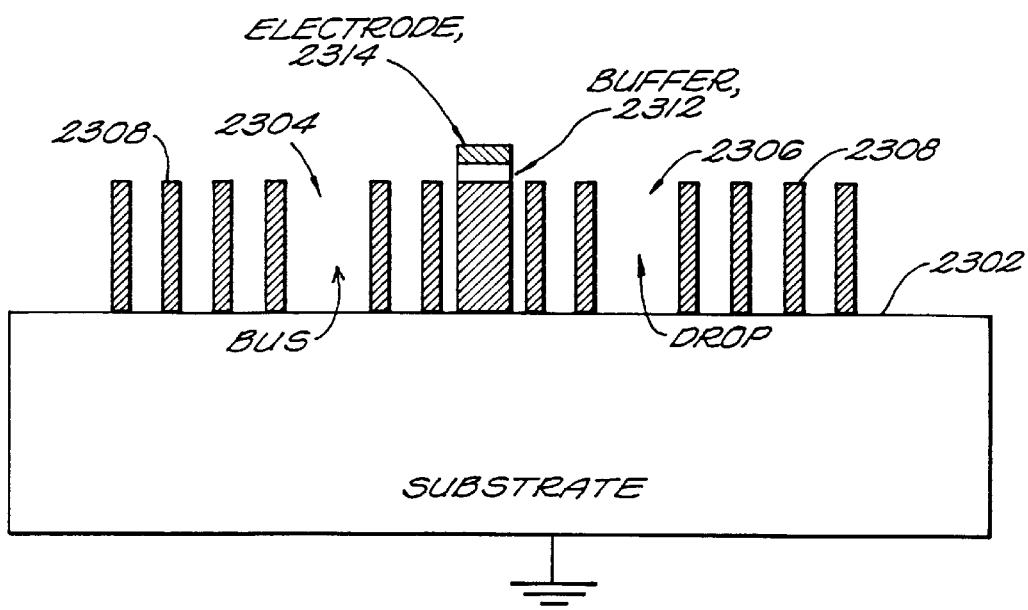

FIGS. 23A and 23B are a plan view and a cross-sectional view taken along line 23—23, respectively, of a photonic crystal resonator-system switch/modulator CDF 2300 in accordance with the invention. The CDF 2300 includes a photonic crystal 2302 having two waveguides, a bus 2304 and a drop 2306. The photonic crystal 2302 is configured as a square lattice of high-index dielectric posts 2308. The posts can have a radius of 0.20 a and a dielectric constant of 11.56, where a is the lattice constant. Two rows of posts are removed to form the waveguides. The coupling element between the two waveguides is a resonator-system which consists of a single cavity 2310. The cavity is made by increasing the radius of a single post from 0.20 a to 0.60 a. Alternatively, as described above, the photonic crystal can be fabricated with channels or holes of air or material having a contrasting dielectric constant. A buffer layer 2312 and an electrode 2314 are attached to the cavity 2310 to transmit an electrical excitation in the form of voltage or current.

Figure 24A:
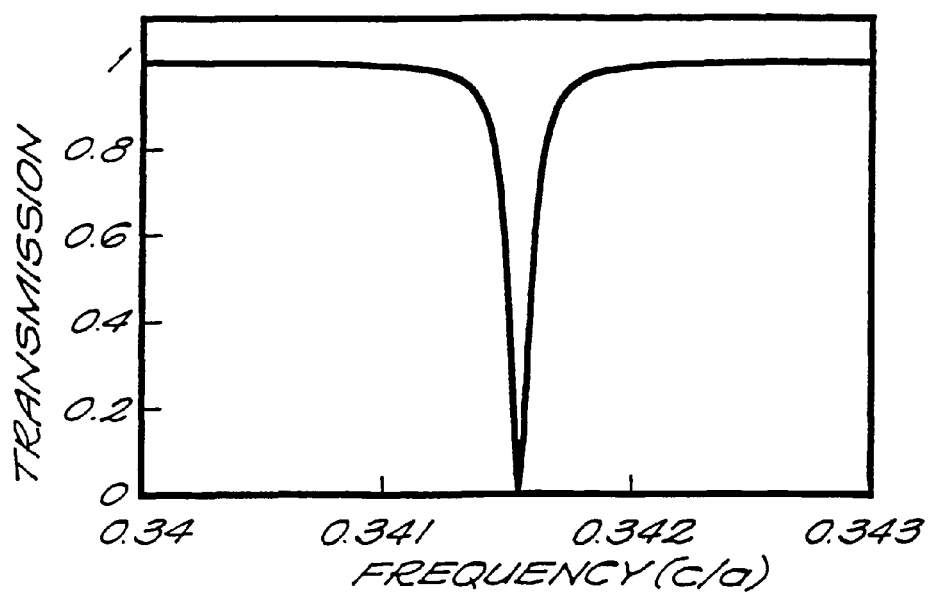
FIGS. 24A and 24B are graphs showing the normalized transmission and transferred spectra for the switch/modulator shown in FIGS. 23A and 23B in an "on" state.
Figure 24B:
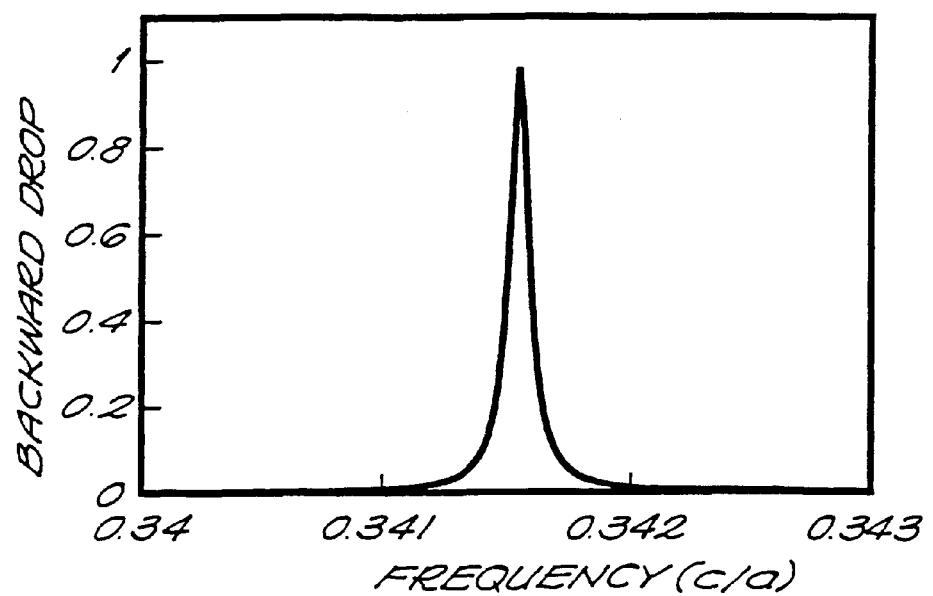

When the electrical excitation is not applied, the material inside the cavity is transparent, (i.e. the absorption coefficient is negligible), and a frequency channel of interest is transferred from the bus waveguide to the drop waveguide. Using a finite-difference time-domain program as described previously, the transfer spectra is computed, as shown in FIGS. 24A and 24B. FIGS. 24A and 24B show the normalized transmission and transferred spectra for the switch/modulator structure shown in FIGS. 23A and 23B. On resonance, a frequency channel is completely transferred from the bus waveguide to the drop waveguide in the backward direction. This condition is referred to as the "on" state. In the simulation, the external quality factor of the resonances is determined to be close to 6,000.

Figure 25A:
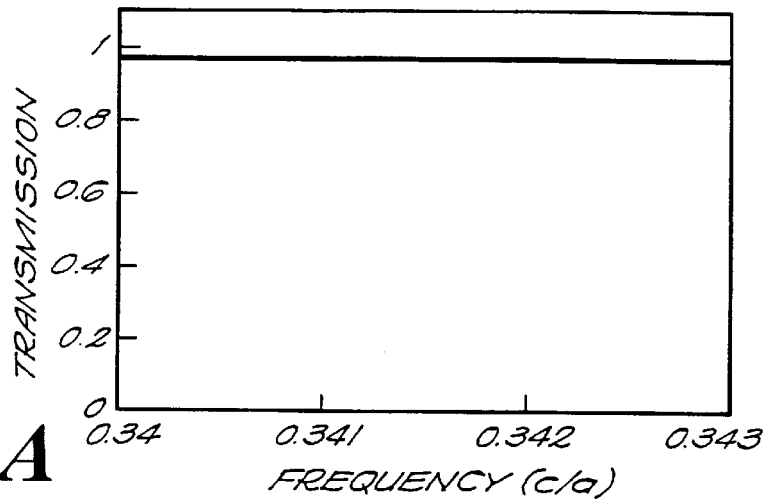
FIGS. 25A and 25B are graphs showing the normalized transmission and transferred spectra for the switch/modulator structure shown in FIGS. 23A and 23B in an "off" state.
Figure 25B:
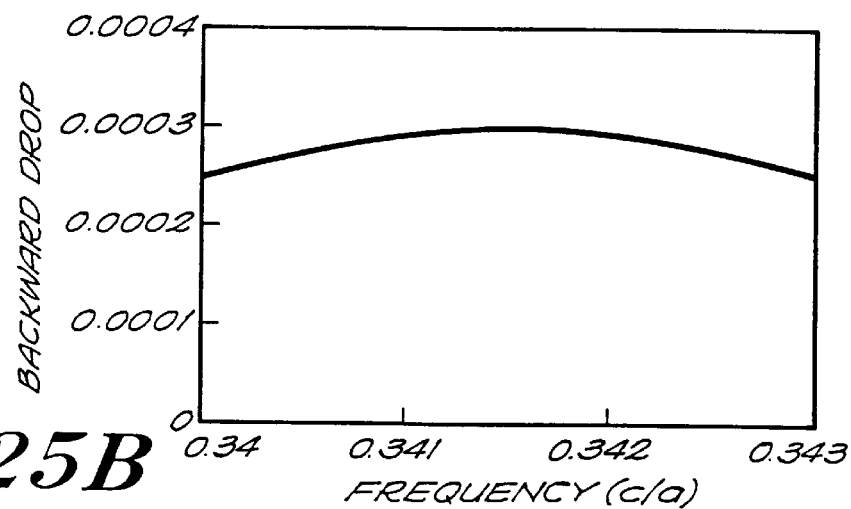

When the electrical excitation is applied, on the other hand, the material inside the cavity becomes absorbing. It has been shown that an internal quality factor of 100 is achievable using readily available materials, such as Si, at a wavelength of 1.55 µm. Both the external and internal quality factors are related to the decaying rates via equations (19) and (20). The response spectra are determined using equations (21)–(25) and plotted in FIGS. 25A and 25B. FIGS. 25A and 25B show the normalized transmission and transferred spectra for the switch/modulator structure shown in FIGS. 23A and 23B. It is noted that the transmission coefficient is close to 100% over the entire frequency range. The transfer from the bus waveguide to the drop waveguide is therefore turned off. This condition is referred to as the "off" state.

Figure 26:
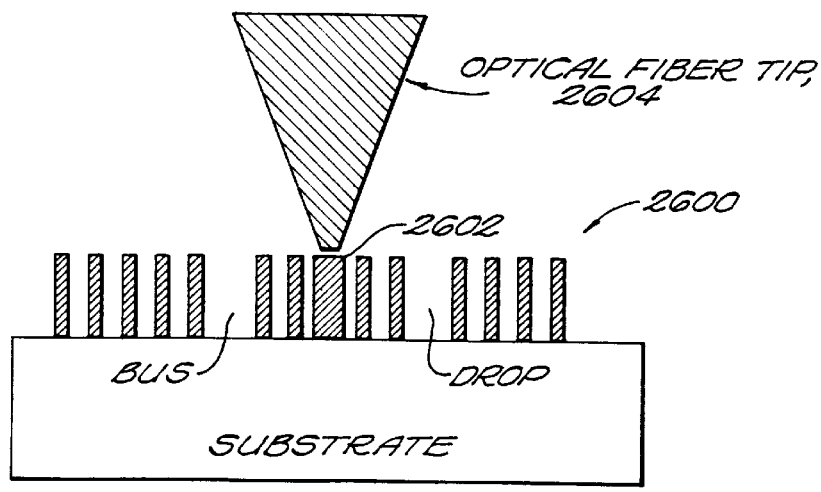
FIG. 26 is a cross-sectional view of an exemplary embodiment of a resonator-system switch/modulator CDF in which absorption is induced through an optical fiber.

In another exemplary embodiment illustrated in FIG. 26, a resonator-system switch/modulator CDF 2600, similar in structure to CDF 2300, has absorption induced optically. Instead of attaching electrodes to the surface of the coupling element cavity 2602, an optical fiber tip 2604 is used to deliver optical excitation locally into the coupling element to change its absorbing characteristics. The optical excitation is applied at a frequency above the electronic bandgap of the semiconductors, which has the effect of exciting electrons from the valence band to the conduction band and to induce free electron absorption. When such optical excitation is not applied, the material inside the cavity remains transparent and the structure is in an "on" state. When such optical excitation is applied, on the other hand, the material inside the cavity becomes absorbing and the structure is switched to an "off" state.

Instead of inducing absorption optically by using an optical fiber tip, the switching can also be achieved mechanically. The same structure as shown in FIG. 26 can be used. In this case, however, there is no need to use absorbing material in the cavities. When the fiber tip is brought close to the cavity, the photon amplitude inside the cavity can escape through the fiber tip. This is analogous to the case where the material absorption is present. The filter is in an "off" state. When the fiber tip is moved away from the cavity, on the other hand, photons cannot escape through the fiber tip. This is analogous to the previous case where the material absorption is absent. The filter is in an "on" state.

Figure 27A:
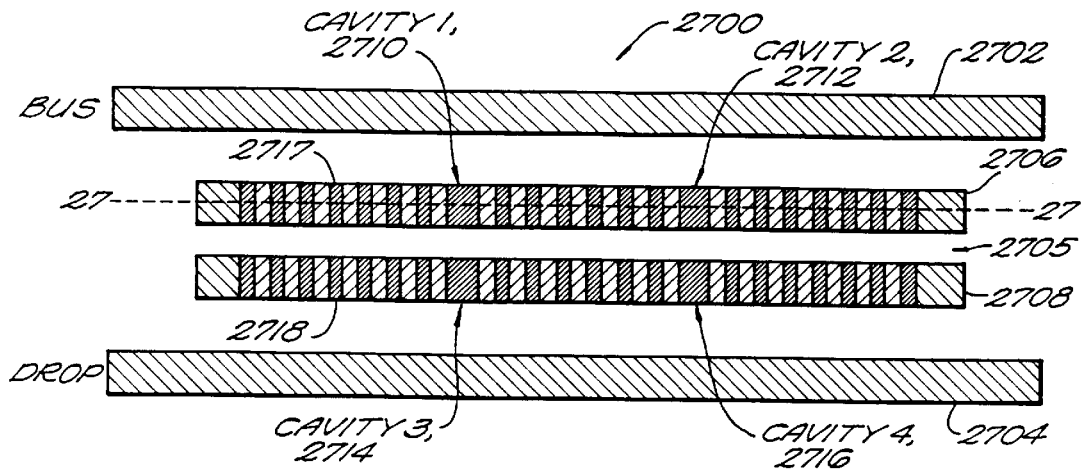
FIGS. 27A and 27B are a plan view and cross-sectional view taken along line 27—27, respectively, of an exemplary embodiment of a resonator-system switch/modulator CDF utilizing electrodes to induce absorption.
Figure 27B:
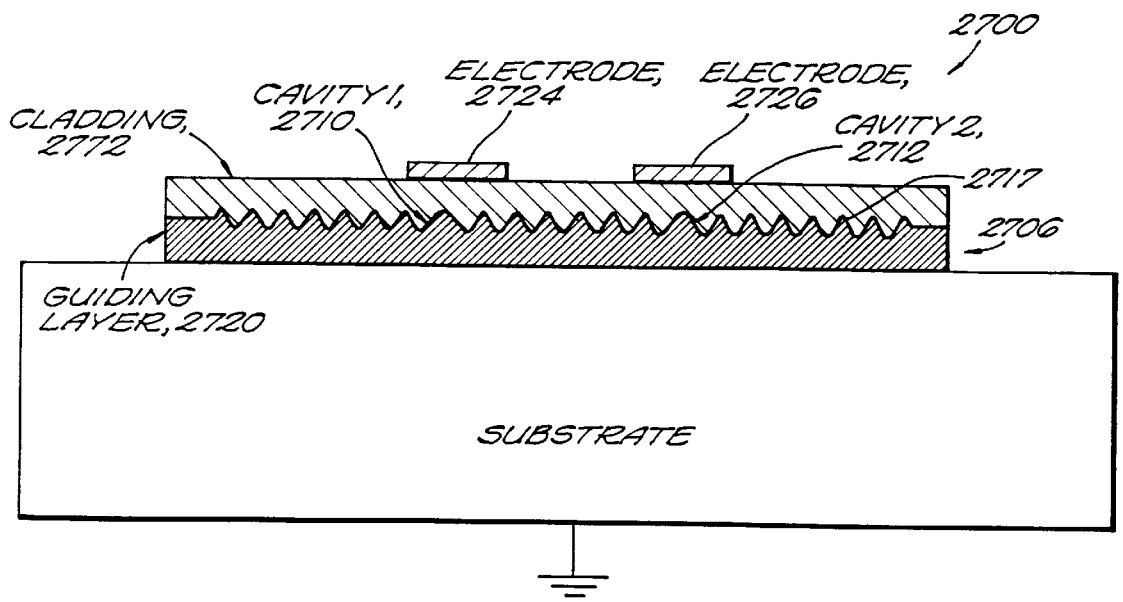

In another exemplary embodiment of the invention, a tunable absorbing material is introduced in the coupling element of a channel drop filter structure similar to the one shown in FIG. 21. FIGS. 27A and 27B are a plan view and cross-sectional view taken along line 27—27, respectively, of a resonator-system switch/modulator CDF 2700. The CDF 2700 utilizes conventional channel bus 2702 and drop 2704 waveguides made of high dielectric material with a resonator-system 2705. In this embodiment, cavities 2710–2716 are made by introducing defects in periodic surface corrugations 2717,2718 on two waveguides 2706, 2708 which define the resonator-system located between the bus and the drop. The waveguides 2706 and 2708 include a guiding layer 2720 and a cladding layer 2722. Furthermore, electrodes 2724 and 2726 are positioned above the cavities 2710 and 2712, respectively.

In contrast with the two previous embodiments, the coupling element in the CDF 2700 is made of four cavities. Two of the cavities (2710 and 2712) are adjacent to the bus waveguide, while the other two cavities (2714 and 2716) are adjacent to the drop waveguide. In this specific embodiment, a separate electrode is attached to each cavity. Since the electrical excitations applied to each electrode can be varied independently, such configuration allows the individual control over the absorbing characteristics of each cavity, and therefore enables more complex switching functionalities, as will be discussed hereinafter.

When electrical excitation is absent in all four electrodes, the material inside the cavity is transparent and a frequency channel is transferred from the bus waveguide to the drop waveguide, as described previously. Again, this condition corresponds to the "on" state. The transfer can be completely turned off by applying electrical excitations simultaneously on all the electrodes. Alternatively, the transfer can also be turned off by applying electrical excitations on only two of the cavities: either cavities 2710 and 2712, or cavities 2714 and 2716.

In addition to the functionality as an on/off switch for transfer from one waveguide to the other, such structure can be also dynamically configured as a narrow-band reflector. Such functionality is achieved by applying electrical excitations to three cavities: cavities 2714 and 2716, and either one of the cavities 2710 and 2712. In this example, the excitation is applied on cavities 2710, 2714 and 2716. At resonance, the wave propagating in the bus waveguide couples into cavity 2712, which in turn decays only into the bus waveguide along both directions. The incoming wave cancels the decaying amplitude along the forward direction in the bus waveguide, leaving the wave to be reflected into the backward direction. Since the resonance displays a narrow-banded Lorentzian lineshape, the reflection will occur only within a narrow frequency range, and therefore the structure can be switched to perform the functionality of a narrow band reflector.

Figure 28:
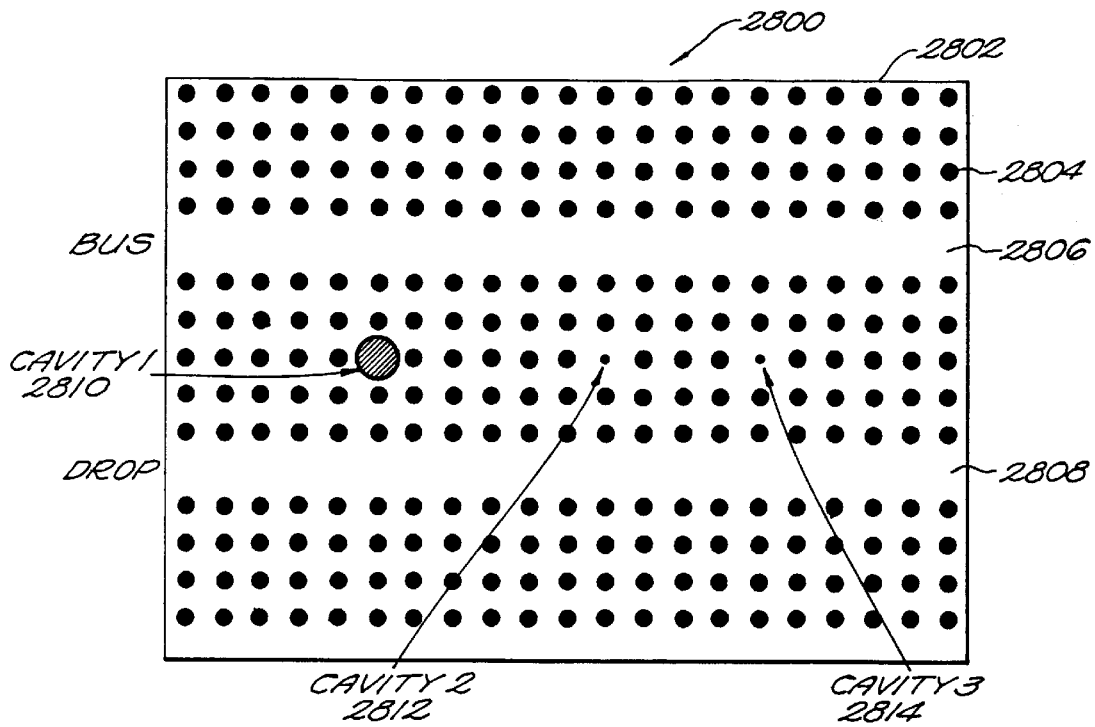
FIG. 28 is a plan view of an exemplary embodiment of a photonic crystal resonator-system switch/modulator CDF with three cavities.

In another exemplary embodiment of the invention, a structure is considered that can switch the transfer from the forward direction to the backward direction in the drop waveguide, in addition to turning on and off the transfer. FIG. 28 is a plan view diagram of a photonic crystal resonator-system switch/modulator CDF 2800 in accordance with the invention. The CDF 2800 includes a photonic crystal 2802 with a periodic arrangement of elements such as rods 2804, a bus 2806 and a drop 2808. The CDF 2800 can be thought of as a combination of the channel drop filter structures shown in FIGS. 3 and 8.

The coupling element is composed of three cavities: a first cavity 2810, which is made of a rod with the radius larger than all other rods and supports two resonant states with opposite symmetry; and cavities 2812 and 2814, each consisting of a rod with a radius smaller than other rods and supporting a single resonant state. An electrode is attached to each cavity, allowing electrical excitation to be applied. In the case where the electrical excitation is applied to all three cavities, the transfer between the bus and drop waveguides is completely turned off. In the case where the electrical excitation is applied only on the first cavity 2810, the material inside the first cavity 2810 becomes absorbing while the material inside cavities 2812 and 2814 remains transparent. Consequently, the optical signal is transferred through cavities 2812 and 2814 along the forward direction in the drop waveguide.

When the electrical excitation is applied only to cavities 2812 and 2814, on the other hand, the material inside the cavities 2812 and 2814 become absorbing, while the material inside cavity 2810 remains transparent. Consequently, the signal is transferred through cavity 2810 along the backward direction of the drop waveguide. Hence, by choosing the electrical excitations, one can switch the device on and off, and one can also switch the device in order for the optical signal to be transferred along either the forward or the backward direction in the drop waveguide.

It will be appreciated by those skilled in the art that the aforementioned embodiments work in a similar fashion when it comes to adding a channel to a data stream. In the absence of absorption, a frequency channel can be transferred into the bus waveguide and added to the data stream. In the presence of absorption, on the other hand, such transfer is turned off.

Figure 29A:
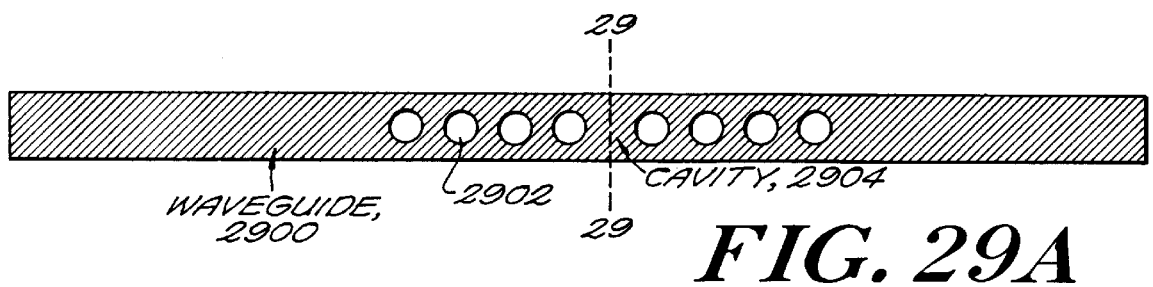
FIGS. 29A and 29B are a plan view and a cross-sectional view taken along line 29—29, respectively, of an exemplary embodiment of a waveguide switch/modulator.
Figure 29B:
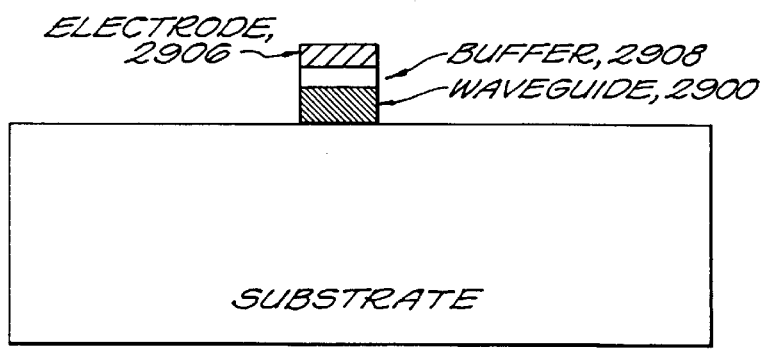

Absorption-induced switching and modulation can further be achieved in the structure of FIGS. 29A and 29B. FIGS. 29A and 29B are a plan view and a cross-sectional view taken along line 29—29, respectively, of a waveguide switch/modulator 2900. A waveguide 2900 includes a periodic series of elements 2902 such as holes. A resonant microcavity 2904 is introduced inside the waveguide by breaking the periodicity of elements 2902. The internal quality factor of the cavity can be affected by different means, whether electrical, optical or mechanical. In this specific embodiment, the internal quality factor is affected by electrical means. Inside the microcavity an absorbing material is introduced. An electrode 2906, and a buffer layer 2908, is attached to the cavity such that its absorbing characteristics can be altered by electrical excitations.

Figure 30A:
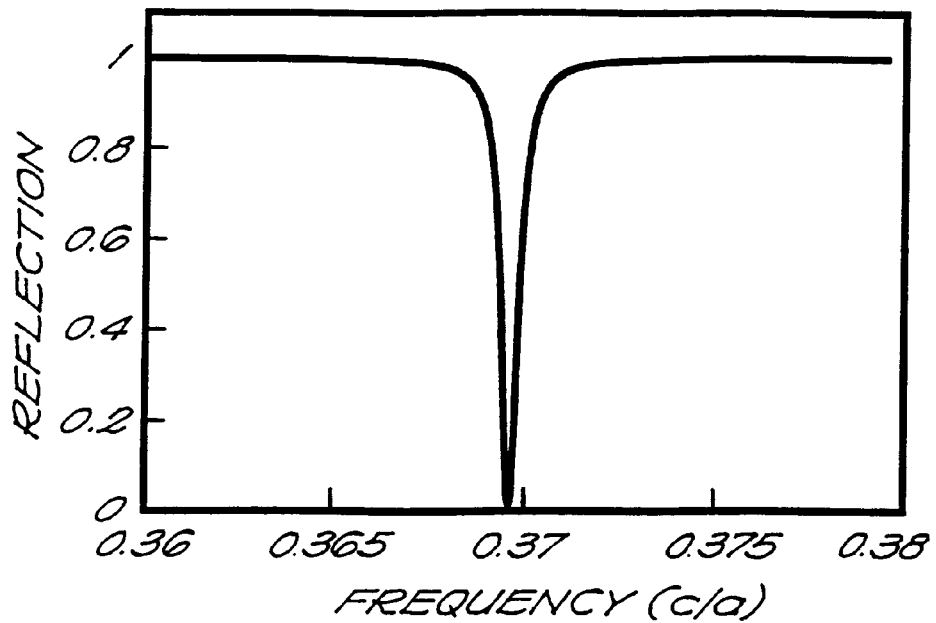
FIGS. 30A and 30B are graphs showing the normalized reflection and transmission spectra of the switch modulator structure shown in FIGS. 29A and 29B in an "on" state.
Figure 30B:
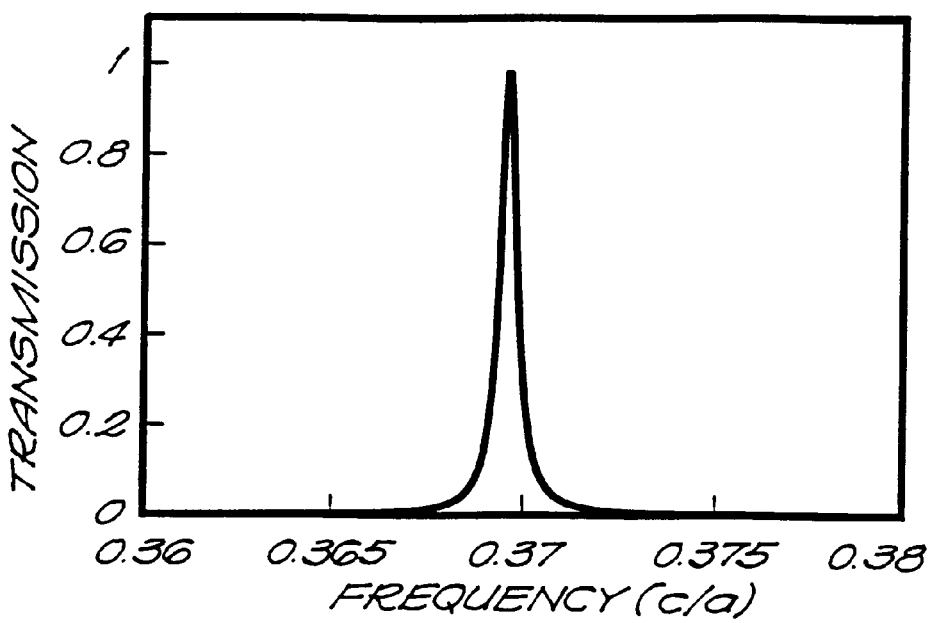

For the case where the electrical excitation is absent, the material inside the cavity is transparent. Away from the resonant frequency, the signal is reflected by the periodic array of holes. At the resonant frequency, on the other hand, the incoming wave couples into the resonance. The reflected signal, therefore, is composed of two parts, a direct reflection from the holes, and the decaying amplitude from the resonance along the backward direction of the waveguide. These two parts cancel, leaving the signal to be transmitted. The results of a finite difference time domain simulation of such a microcavity structure are shown in the graphs of FIGS. 30A and 30B. FIGS. 30A and 30B show the normalized reflection and transmission spectra of the switch/modulator structure shown in FIGS. 29A and 29B in an "on" state. The transmission spectrum displays a Lorentzian lineshape with a quality factor of 1500. When the electrical excitation is applied, on the other hand, the resonance inside the cavity is spoiled.

Figure 31A:
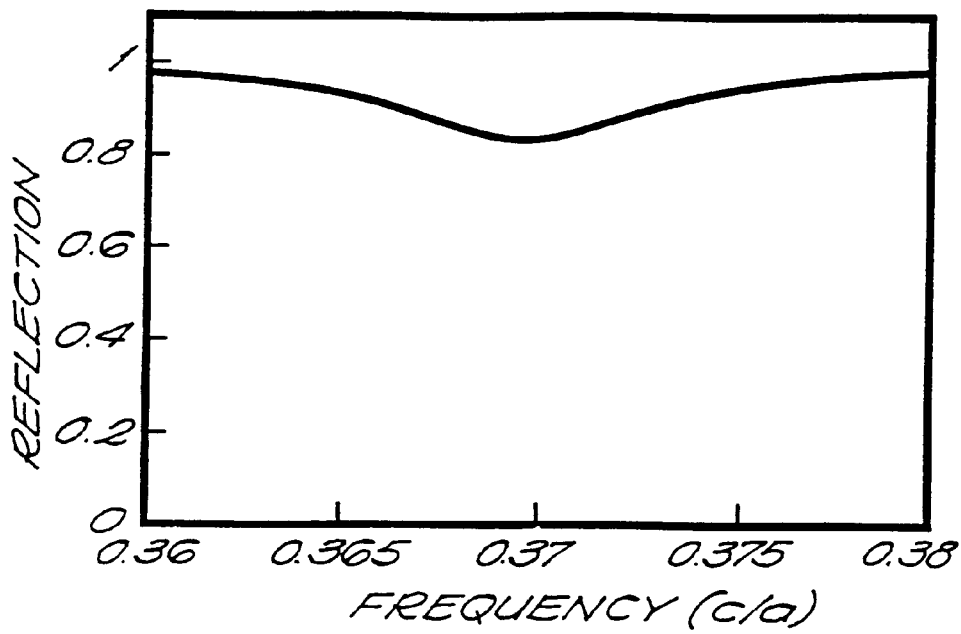
FIGS. 31A and 31B are graphs showing the normalized reflection and transmission spectra of the switch modulator structure shown in FIGS. 29A and 29B in an "off" state.
Figure 31B:
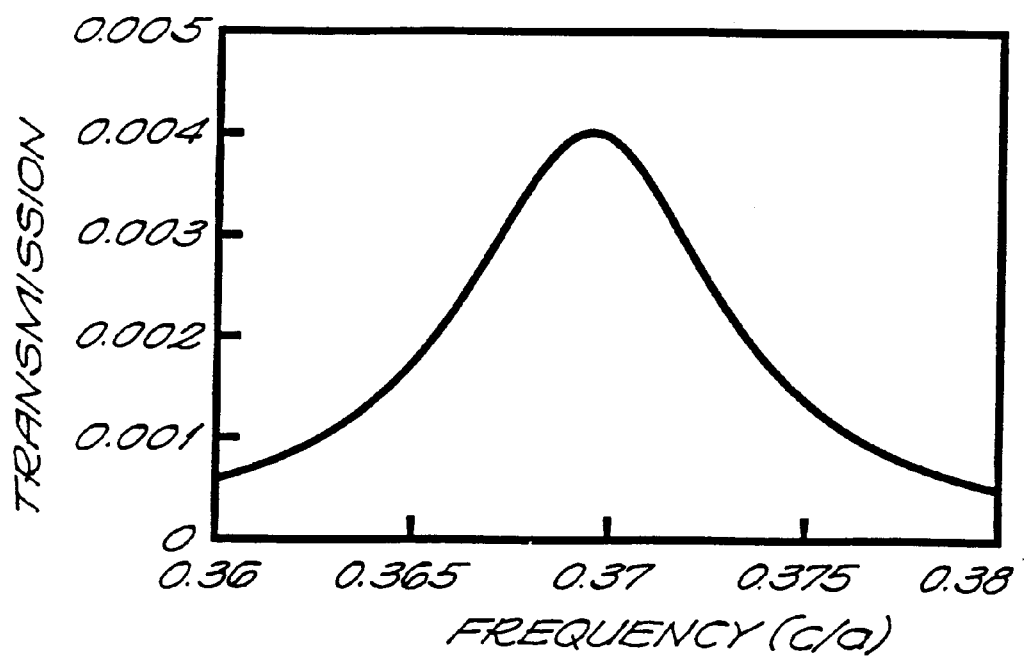

In the case where the internal quality factor is close to 100, the response spectra is calculated using the Hamiltonian approach described above and shown in FIGS. 31A and 31B. FIGS. 31A and 31B show the normalized reflection and transmission spectra of the switch modulator structure shown in FIGS. 29A and 29B in an "off" state. The transmission is almost completely turned of f while most of the signal is reflected. This device therefore allows us to switch between transmission and reflection.

The foregoing description has been set forth to illustrate the invention and is not intended to be limiting. Since modifications of the described embodiments incorporating the spirit and substance of the invention may occur to persons skilled in the art, the scope of the invention should be limited solely with reference to the appended claims and equivalents thereof.

What is claimed is:

1. An electromagnetic field frequency filter comprising:
    an input waveguide which carries a signal having at least one frequency including at least one desired frequency;
    an output waveguide; and
    a resonator-system coupled between said input and output waveguides operable for the adjustable transfer of said at least one desired frequency to said output waveguide and transmission of undesired frequencies through said input waveguide in response to a variation of the internal decaying rate of at least one resonator of said resonator-system, said resonator-system being comprised of resonators, and defining at least two system modes of opposite symmetry, said system modes consisting in part of a linear combination of resonant modes of said resonators, said resonator-system being specifically configured such that at least two of said system modes have substantially the same frequency when said transfer occurs substantially.

2. The filter of claim 1, wherein said at least two system modes have substantially the same energy dissipation rate into said waveguides when said transfer occurs substantially.

3. The filter of claim 1, wherein said at least two system modes dissipate into each of said input and output waveguides at substantially the same energy dissipation rate when said transfer occurs substantially.

4. The filter of claim 1, wherein said system modes dissipate at substantially the same energy dissipation rate when said transfer occurs substantially.

5. The filter of claim 1, wherein said specific configuration of resonator-system is accomplished by changing geometry or refractive index.

6. The filter of claim 1, wherein said at least two system modes comprise an even system mode and an odd system mode.

7. The filter of claim 1, wherein said resonator-system comprises at least one external sub-element that couples directly with said input waveguide.

8. The filter of claim 7, wherein said resonator-system comprises at least one external sub-element that couples directly with said output waveguide.

9. The filter of claim 7, wherein said resonator-system comprises at least one internal sub-element that couples directly with said external sub-element but not directly with said input waveguide.

10. The filter of claim 1, wherein said internal decaying rate of said at least one resonator is varied by changing the absorption characteristics of said resonator-system.

11. The filter of claim 1, wherein said internal decaying rate of said at least one resonator is varied by an electrical, optical, or mechanical means.

12. The filter of claim 1, wherein said input waveguide has an input port and an output port, said output waveguide has a forward port and a backward port, and said internal decaying rate of said at least one resonator is varied to provide selective switching of said desired frequency into one of said four ports.

13. The filter of claim 1, wherein said input waveguide has an input port and an output port, said output waveguide has a forward port and a backward port, and said internal decaying rate of said at least one resonator is varied to provide selective splitting of said desired frequency into at least two of said four ports.

14. The filter of claim 1, wherein said input waveguide has an input port and an output port, said output waveguide has a forward port and a backward port, and said internal decaying rate of said at least one resonator is varied in time to provide selective time-varying switching of said desired frequency into one of said four ports.

15. The filter of claim 1, wherein said input waveguide has an input port and an output port, said output waveguide has a forward port and a backward port, and said internal decaying rate of said at least one resonator is varied in time to provide selective time-varying splitting of said desired frequency into at least two of said four ports.

16. An electromagnetic field frequency filter comprising:
    an input waveguide which carries a signal having at least one frequency including at least one desired frequency;
    an output waveguide; and
    a resonator-system coupled between said input and output waveguides operable for the adjustable transfer of said at least one desired frequency to said output waveguide and transmission of undesired frequencies through said input waveguide in response to a variation of the internal decaying rate of at least one resonator of said resonator-system, said resonator-system being comprised of resonators, and including at least two resonators that couple directly to said input waveguide with similar coupling strength and that further couple directly with each other, said at least two resonators each supporting no more than one resonant mode at or near said desired frequency.

17. The filter of claim 16, wherein said resonator-system defines at least two system modes of opposite symmetry, said system modes consisting in part of a linear combination of resonant modes of said resonators, said resonator-system being specifically configured such that at least two of said system modes have substantially the same frequency when said transfer occurs substantially.

18. The filter of claim 17, wherein said at least two system modes have substantially the same energy dissipation rate into said waveguides when said transfer occurs substantially.

19. The filter of claim 17, wherein said at least two system modes dissipate into each of said input and output waveguides at substantially the same energy dissipation rate when said transfer occurs substantially.

20. The filter of claim 17, wherein said system modes dissipate at substantially the same energy dissipation rate when said transfer occurs substantially.

21. The filter of claim 17, wherein said at least two system modes comprise an even system mode and an odd system mode.

22. The filter of claim 16, wherein said internal decaying rate of said at least one resonator is varied by changing the absorption characteristics of said resonator-system.

23. The filter of claim 16, wherein said internal decaying rate of said at least one resonator is varied by an electrical, optical, or mechanical means.

24. The filter of claim 16, wherein said input waveguide has an input port and an output port, said output waveguide has a forward port and a backward port, and said internal decaying rate of said at least one resonator is varied to provide selective switching of said desired frequency into one of said four ports.

25. The filter of claim 16, wherein said input waveguide has an input port and an output port, said output waveguide has a forward port and a backward port, and said internal decaying rate of said at least one resonator is varied to provide selective splitting of said desired frequency into at least two of said four ports.

26. The filter of claim 16, wherein said input waveguide has an input port and an output port, said output waveguide has a forward port and a backward port, and said internal decaying rate of said at least one resonator is varied in time to provide selective time-varying switching of said desired frequency into one of said four ports.

27. The filter of claim 16, wherein said input waveguide has an input port and an output port, said output waveguide has a forward port and a backward port, and said internal decaying rate of said at least one resonator is varied in time to provide selective time-varying splitting of said desired frequency into at least two of said four ports.

28. An electromagnetic field frequency filter comprising:
an input waveguide which carries a signal having at least one frequency including at least one desired frequency;
an output waveguide; and
a photonic crystal resonator-system coupled between said input and output waveguides and being operable for the adjustable transfer of said at least one desired frequency to said output waveguide and transmission of undesired frequencies through said input waveguide in response to a variation of the internal decaying rate of at least one resonator of said resonator-system.

29. The filter of claim 28, wherein said resonator-system is comprised of resonators, and defines at least two system modes of opposite symmetry, said system modes consisting in part of a linear combination of resonant modes of said resonators, said resonator-system being specifically configured such that at least two of said system modes have substantially the same frequency when said transfer occurs substantially.

30. The filter of claim 29, wherein said at least two system modes have substantially the same energy dissipation rate into said waveguides when said transfer occurs substantially.

31. The filter of claim 29, wherein said at least two system modes dissipate into each of said input and output waveguides at substantially the same energy dissipation rate when said transfer occurs substantially.

32. The filter of claim 29, wherein said system modes dissipate at substantially the same energy dissipation rate when said transfer occurs substantially.

33. The filter of claim 29, wherein said at least two system modes comprise an even system mode and an odd system mode.

34. The filter of claim 28, wherein said photonic crystal resonator-system comprises at least two single-mode resonators.

35. The filter of claim 28, wherein said photonic crystal resonator-system comprises at least one resonator with two resonant modes of opposite symmetry.

36. The filter of claim 28, wherein said photonic crystal resonator-system comprises a periodic dielectric structure having at least one defect defining at least one resonator.

37. The filter of claim 28, wherein said photonic crystal resonator-system and said waveguides are integrated into a single photonic crystal.

38. The filter of claim 28, wherein said internal decaying rate of said at least one resonator is varied by changing the absorption characteristics of said resonator-system.

39. The filter of claim 28, wherein said internal decaying rate of said at least one resonator is varied by an electrical, optical, or mechanical means.

40. The filter of claim 28, wherein said input waveguide has an input port and an output port, said output waveguide has a forward port and a backward port, and said internal decaying rate of said at least one resonator is varied to provide selective switching of said desired frequency into one of said four ports.

41. The filter of claim 28, wherein said input waveguide has an input port and an output port, said output waveguide has a forward port and a backward port, and said internal decaying rate of said at least one resonator is varied to provide selective splitting of said desired frequency into at least two of said four ports.

42. The filter of claim 28, wherein said input waveguide has an input port and an output port, said output waveguide has a forward port and a backward port, and said internal decaying rate of said at least one resonator is varied in time to provide selective time-varying switching of said desired frequency into one of said four ports.

43. The filter of claim 28, wherein said input waveguide has an input port and an output port, said output waveguide has a forward port and a backward port, and said internal decaying rate of said at least one resonator is varied in time to provide selective time-varying splitting of said desired frequency into at least two of said four ports.

44. An electromagnetic field frequency filter comprising:
a waveguide having an input port and an output port, said waveguide receiving a signal having at least one frequency including at least one desired frequency; and
a resonator-system incorporated in said waveguide between said input and output ports, said resonator-system defining at least one resonant mode, said resonator-system operable for the adjustable transmission of said at least one desired frequency to said output port in response to a variation of the internal decaying rate of at least one resonator of said resonator-system.

45. The filter of claim 44, wherein said internal decaying rate of said at least one resonator is varied by changing the absorption characteristics of said resonator-system.

46. The filter of claim 44, wherein said internal decaying rate of said at least one resonator is varied by an electrical, optical, or mechanical means.

47. The filter of claim 44, wherein said internal decaying rate of said at least one resonator is varied to provide selective switching of said desired frequency between said input port and said output port.

48. The filter of claim 44, wherein said internal decaying rate of said at least one resonator is varied to provide selective splitting of said desired frequency into said input port and said output port.

49. The filter of claim 44, wherein said internal decaying rate of said at least one resonator is varied in time to provide selective time-varying switching of said desired frequency between said input port and said output port.

50. The filter of claim 44, wherein said internal decaying rate of said at least one resonator is varied in time to provide selective time-varying splitting of said desired frequency into said input port and said output port.

* * * * *